(12) United States Patent
Amaya et al.

(10) Patent No.: US 11,674,479 B2
(45) Date of Patent: Jun. 13, 2023

(54) MULTI-PHYSICS FLUID ATOMIZER AND METHODS

(71) Applicant: ENGINETICS, LLC, Charlotte, NC (US)

(72) Inventors: John Amaya, Canton, MI (US); Luke Cruff, Van Buren Township, MI (US); Joseph Lull, South Haven, MI (US); Marcel Prado, Belleville, MI (US); Bradley J. Vieau, Seattle, WA (US)

(73) Assignee: Enginetics, LLC, Charlotte, NC (US)

( * ) Notice: Subject to any disclaimer, the term of this patent is extended or adjusted under 35 U.S.C. 154(b) by 206 days.

(21) Appl. No.: 17/141,032

(22) Filed: Jan. 4, 2021

(65) Prior Publication Data

US 2021/0215124 A1 Jul. 15, 2021

Related U.S. Application Data

(63) Continuation of application No. 16/209,689, filed on Dec. 4, 2018, now Pat. No. 10,883,454, which is a
(Continued)

(51) Int. Cl.
*F02M 29/06* (2006.01)
*B05B 7/04* (2006.01)
(Continued)

(52) U.S. Cl.
CPC ........... *F02M 29/06* (2013.01); *B05B 7/0466* (2013.01); *F02M 35/10085* (2013.01);
(Continued)

(58) Field of Classification Search
CPC ............. F02M 29/06; F02M 35/10085; F02M 35/10216; F02M 67/00; F02M 67/02;
(Continued)

(56) References Cited

U.S. PATENT DOCUMENTS 2,693,311 A 11/1954 Kratzer
2,867,375 A 1/1959 Petersen
(Continued)

FOREIGN PATENT DOCUMENTS

GB 2033251 A 5/1980
JP H1-61461 U 4/1989
(Continued)

OTHER PUBLICATIONS

Bullough, W.A., et al., The Electro-Rheological Clutch: Design Performance Characteristics and Operation, Proceedings of the Institution of Mechanical Engineers, Part I: Journal of Systems and Control Engineering, May 1993, 207:87-95, (9 pp.).
(Continued)

*Primary Examiner* — Darren W Gorman
(74) *Attorney, Agent, or Firm* — Blank Rome LLP

(57) ABSTRACT

A fluid mixing device that includes a housing having a fuel inlet and at least one primary orifice positioned at the inlet, wherein the at least one orifice configured to disperse a stream of fuel into a plurality of fuel droplets. The plurality of fuel droplets contact a fuel impingement surface to break up the plurality of fuel droplets into a plurality of smaller secondary droplets and create a thin film of secondary droplets on the impingement surface. At least one pressurized air channel delivers an airflow into contact with the secondary droplets. The secondary droplets pass through a plurality of secondary outlet orifices to exit the housing. A size of the plurality of secondary droplets is reduced when passing out of the plurality of secondary orifices.

27 Claims, 17 Drawing Sheets

Related U.S. Application Data continuation of application No. 15/677,314, filed on Aug. 15, 2017, now Pat. No. 10,151,281, which is a continuation of application No. 15/145,591, filed on May 3, 2016, now Pat. No. 9,771,903, which is a continuation of application No. 14/209,385, filed on Mar. 13, 2014, now Pat. No. 9,441,580, which is a continuation of application No. 12/783,868, filed on May 20, 2010, now Pat. No. 8,672,234.

(51) Int. Cl.

| | | |
|---|---|---|
| F02M 69/08 | (2006.01) | |
| F02M 67/00 | (2006.01) | |
| F02M 67/02 | (2006.01) | |
| F02M 69/04 | (2006.01) | |
| F02M 69/00 | (2006.01) | |
| B05B 1/26 | (2006.01) | |
| F02M 35/10 | (2006.01) | |
| F23D 11/24 | (2006.01) | |
| F23D 11/40 | (2006.01) | |

(52) U.S. Cl.
CPC ...... *F02M 35/10216* (2013.01); *F02M 67/00* (2013.01); *F02M 67/02* (2013.01); *F02M 69/00* (2013.01); *F02M 69/047* (2013.01); *F02M 69/08* (2013.01); *F23D 11/24* (2013.01); *F23D 11/40* (2013.01); *B05B 1/265* (2013.01); *Y02T 10/12* (2013.01)

(58) Field of Classification Search
CPC ...... F02M 67/10; F02M 69/00; F02M 69/047; F02M 69/08; B05B 1/26; B05B 1/262; B05B 1/265; B05B 7/04; B05B 7/0416; B05B 7/0466; B05B 7/0483; F23D 11/24; F23D 11/40; Y02T 10/12; Y02T 10/146
See application file for complete search history.

(56) References Cited

U.S. PATENT DOCUMENTS

| | | | |
|---|---|---|---|
| 3,515,353 A | 6/1970 | Young et al. | |
| 3,907,207 A | 9/1975 | O'Brien | |
| 3,929,290 A | 12/1975 | Tallarovic | |
| 3,963,379 A | 6/1976 | Ueno | |
| 4,828,181 A | 5/1989 | Singels-Craenen | |
| 4,982,716 A | 1/1991 | Takeda et al. | |
| 5,035,358 A | 7/1991 | Katsuno et al. | |
| 5,224,458 A | 7/1993 | Okada et al. | |
| 5,301,879 A | 4/1994 | Takeda et al. | |
| 5,360,166 A | 11/1994 | Nogi et al. | |
| 5,518,182 A | 5/1996 | Sasao | |
| 5,732,885 A | 3/1998 | Huffman | |
| 5,904,299 A | 5/1999 | Hans et al. | |
| 5,997,259 A | 12/1999 | Marshall et al. | |
| 6,039,029 A | 3/2000 | Nagasaka et al. | |
| 6,065,691 A | 5/2000 | West | |
| 6,092,741 A | 7/2000 | Sumida | |
| 6,095,437 A | 8/2000 | Nozawa et al. | |
| 6,205,983 B1 | 3/2001 | Egizi | |
| 6,322,003 B1 | 11/2001 | Haruch | |
| 6,561,167 B2 | 5/2003 | Berndt | |
| 7,036,753 B2 | 5/2006 | Huffman | |
| 7,104,477 B2 | 9/2006 | Kilgore et al. | |
| 7,108,203 B2 * | 9/2006 | Huffman | B05B 7/0475 239/432 |
| 8,672,241 B2 | 3/2014 | Wurz | |
| 2007/0169760 A1 | 7/2007 | Rock | |
| 2009/0226362 A1 * | 9/2009 | Randolph, III | B05B 7/0475 423/539 |

FOREIGN PATENT DOCUMENTS

| | | |
|---|---|---|
| JP | H5-202826 A | 8/1993 |
| JP | 2010-077865 A | 4/2010 |
| JP | 2010-101290 A | 5/2010 |
| RU | 2059100 C1 | 4/1996 |
| RU | 2329873 C2 | 7/2008 |
| WO | 03095097 A1 | 11/2003 |
| WO | 2009036947 A1 | 3/2009 |
| WO | 2011041890 A1 | 4/2011 |

OTHER PUBLICATIONS

Johnson, A.R., et al., Fluid Durability in a High Speed Electro-Rheological Clutch, Journal of Intelligent Material Systems and Structures, vol. 4 (4):527-532 SAGE—Oct. 1, 1993 (7 pp.).

Wall, John, Microprocessor Clutch Controller and Electro Rheological Clutch, Dec. 2, 1988, (5 pp.).

Supplementary European Search Report for EP Application No. 11783964, dated Jul. 11, 2017 (4 pp.).

* cited by examiner

MULTI-PHYSICS FLUID ATOMIZER AND METHODS

CROSS-REFERENCE TO RELATED APPLICATIONS

This application is a continuation of application Ser. No. 16/209,689, filed Dec. 4, 2018 and entitled MULTI-PHYSICS FUEL ATOMIZER AND METHODS, pending, which is a continuation of application Ser. No. 15/677,314, filed Aug. 15, 2017, and entitled MULTI-PHYSICS FUEL ATOMIZER AND METHODS, now U.S. Pat. No. 10,151,281, issued Dec. 11, 2018, which is a continuation of application Ser. No. 15/145,591, filed May 3, 2016, and entitled MULTI-PHYSICS FUEL ATOMIZER AND METHODS, now U.S. Pat. No. 9,771,903, issued Sep. 16, 2017, which is a continuation of application Ser. No. 14/209,385, filed Mar. 13, 2014, and entitled MULTI-PHYSICS FUEL ATOMIZER AND METHODS, now U.S. Pat. No. 9,441,580, issued Sep. 13, 2016, which is a continuation of application Ser. No. 12/783,868, filed May 20, 2010, and entitled MULTI-PHYSICS FUEL ATOMIZER AND METHODS, now U.S. Pat. No. 8,672,234, issued Mar. 18, 2014, the disclosures of which are incorporated, in their entireties, by this reference.

TECHNICAL FIELD

The present disclosure is directed to fuel systems, and more particularly directed to fuel delivery systems that use multiple stages to enhance evaporation of the fuel.

BACKGROUND

Many types of devices have been developed over the years for the purpose of converting liquids into aerosols or fine particles readily converted into a gas-phase. Many such devices have been developed, for example, to prepare fuel for use in internal combustion engines. To optimize fuel oxidation within an engine's combustion chamber, the fuel must be vaporized, homogenized with air, and in a chemically-stoichiometric gas-phase mixture. Ideal fuel atomization and vaporization enables more complete combustion and consequent lower engine out pollution.

More specifically, relative to internal combustion engines, stoichiometricity is a condition where the amount of oxygen required to completely burn a given amount of fuel is supplied in a homogeneous mixture resulting in optimally correct combustion with no residues remaining from incomplete or inefficient oxidation. Ideally, the fuel should be completely vaporized, intermixed with air, and homogenized prior to ignition for proper oxidation. Non-vaporized fuel droplets do not ignite or combust completely in conventional internal and external combustion engines, which degrades fuel efficiency and increases engine out pollution.

Attempts to reduce or control emission byproducts by adjusting temperature and pressure typically affects the $NO_x$ byproduct. To meet emission standards, these residues must be dealt with, typically requiring after treatment in a catalytic converter or a scrubber. Such treatment of these residues results in additional fuel costs to operate the catalytic converter or scrubber and may require additional component costs as well as packaging and mass implications. Accordingly, any reduction in engine out residuals resulting from incomplete combustion would be economically and environmentally beneficial.

Aside from the problems discussed above, a fuel that is not completely vaporized in a chemically stoichiometric air/fuel mixture causes the combustion engine to perform at less than peak efficiency. A smaller portion of the fuel's chemical energy is converted to mechanical energy when fuel is not completely combusted. Fuel energy is wasted and unnecessary pollution is created. Thus, by further breaking down and more completely vaporizing the fuel-air mixture, better fuel efficiency may be available.

Many attempts have been made to alleviate the above-described problems with respect to fuel vaporization and incomplete fuel combustion. In automobile engines, for example, inlet port or direct fuel injection have almost universally replaced carburetion for fuel delivery. Fuel injectors spray fuel directly into the inlet port or cylinder of the engine and are controlled electronically. Injectors facilitate more precise metering and control of the amount of fuel delivered to each cylinder independently relative to carburetion. This reduces or eliminates charge transport time facilitating optimal transient operation. Nevertheless, the fuel droplet size of a fuel injector spray is not optimal and there is little time for the fuel to mix with air prior to ignition.

Moreover, it has been recently discovered that fuel injector sprays are accompanied by a shockwave in the fuel spray. The shockwave may prevent the fuel from fully mixing with air. The shockwave appears to limit fuel mass to certain areas of the piston, limiting the fuel droplets' access to air.

Other prior systems, such as heated injectors and heated fuel rails have also been developed in attempts to remedy the problems related to fuel vaporization and incomplete fuel combustion.

SUMMARY

The principles described herein may address some of the above-described deficiencies and others. Specifically, some of the principles described herein relate to liquid processor apparatuses and methods.

One aspect provides a fuel atomizer that includes a housing having a fuel inlet, at least one primary fuel exit orifice, a fuel impingement surface, at least one air, or oxidant, inlet or supply channel, and a plurality of secondary atomizer outlet orifices. At least one primary orifice is positioned at the fuel inlet and is configured to disperse a stream of fuel into a plurality of fuel droplets. The fuel impingement surface is configured and arranged to be contacted by the plurality of fuel droplets to break up the plurality of fuel droplet into a plurality of smaller secondary droplets and create a thin film of secondary fuel droplets on the impingement surface. At least one pressurized air channel is configured to deliver an air flow into contact with the secondary droplets. The plurality of secondary orifices are arranged to have the secondary droplets pass through to exit the housing. The size of the plurality of secondary droplets is reduced when passing through the plurality of secondary orifices.

At least one primary orifice positioned at the fuel inlet may be arranged coaxially with the fuel impingement surface. The plurality of secondary droplets may accelerate to high velocity speed when passing through the plurality of secondary orifices. The housing may be one of a manifold, a cylinder, a head combustion chamber, and an intake port into a cylinder head. The fuel impingement surface may be arranged at an angle in the range of about, but not constrained or limited to, 90 degrees to about 135 degrees relative to a longitudinal axis of the housing. The plurality of secondary orifices may be arranged at an angle between about 0 degrees and about 90 degrees relative to a longitudinal axis of the housing. The fuel atomizer may further comprise a fuel metering member that defines the primary fuel inlet orifice.

Another aspect of the present disclosure relates to a method of atomizing fuel that includes providing an atomizing device comprising at least one primary orifice, an impingement surface, a mixing chamber, and a plurality of secondary orifices, passing a stream of fuel through the at least one primary orifice to create a plurality of first fuel droplets, and contacting the plurality of first fuel droplets against the impingement surface to break up the plurality of fuel droplets into a plurality of smaller sized secondary droplets and create a thin film of secondary droplets on the impingement surface. The method also includes mixing the plurality of second droplets with a pressurized air flow to form a fuel/air mixture, passing the fuel/air mixture through the plurality of secondary orifices to shear the plurality of second droplets into a plurality of smaller sized third droplets, and dispersing the plurality of third droplets from the atomizing device.

The step of providing the atomizing device may include arranging at least one primary fuel orifice, the impingement surface, and plurality of secondary orifices coaxially. Mixing the plurality of second droplets with a pressurized air flow may include delivering a flow of air in a direction that is at least partially radial. Passing the fuel/air mixture through the plurality of secondary orifices may include rapid acceleration of the fuel/air mixture to high velocity speeds. The atomizing device may further include a fuel metering device that defines at least one primary orifice, and passing a stream of fuel through the at least one primary orifice with the fuel metering device.

A further aspect of the present disclosure relates to a pre-combustion fuel mixing device that includes a housing, a valve, a first nozzle member, an impingement surface, a mixing chamber, a plurality of air passages, a plurality of second orifices, and a dispersing nozzle. The valve is enclosed by the housing and arranged to deliver a stream of fuel. The first nozzle member includes a plurality of first orifices, wherein passage of the stream of fuel through the plurality of first orifices creates a plurality of first fuel droplets. The impingement surface is arranged in a flow path of the plurality of first fuel droplets, wherein contacting the plurality of first fuel droplets against the impingement surface breaks up the plurality of first fuel droplets into a plurality of smaller sized second droplets. The plurality of angled air passages leads into the mixing chamber, wherein a flow of pressurized air is delivered through the air passages to mix with the plurality of second droplets to create a fuel/air mixture. The plurality of second orifices are arranged to have the fuel air mixture pass, wherein the plurality of second droplets accelerate to high velocity (e.g., sonic) speed when passing through the plurality of second orifices to reduce a size of the plurality of second droplets to a plurality of smaller sized third droplets. The dispersing nozzle spaces apart the plurality of third droplets to permit an increased evaporation rate of the plurality of third droplets.

At least a portion of the impingement surface may be arranged at an angle relative to a longitudinal axis of the device. The dispersing nozzle may be removably mounted to the housing or fully integrated as a single component. The plurality of angled air passages may be arranged at an angle relative to a longitudinal axis of the device. The plurality of angled air passages may include a secondary angle relative to the impingement surface, thereby forming a compound angle that induces a helical rotation to the pressurized air flow. The plurality of secondary orifices may be arranged at an angle relative to a longitudinal axis of the device.

Another aspect of the present disclosure relates to a method of vaporizing fuel that includes providing a fuel atomizing device that includes a fuel metering device, an impingement surface, and a plurality of outlet orifices, controlling a pressurized air flow to deliver air through the housing and out of the plurality of outlet orifices to create an air flow, and controlling a fuel supply to deliver a flow of fuel from the fuel metering device onto the impingement surface, the flow of fuel including a plurality of first fuel droplets that break up into smaller sized second fuel droplets upon contacting the impingement surface. The method also includes mixing the second fuel droplets with the air flow, moving the second fuel droplets through the plurality of outlet orifices, the second fuel droplets breaking up into smaller sized third fuel droplets upon exiting the plurality of outlet orifices, enhancing, accelerating or promoting rapid vaporization of the third fuel droplets as the third fuel droplets disperse from the plurality of outlet orifices. The method may further include controlling the fuel source to turn OFF the flow of fuel while maintaining the air flow, and controlling the pressurized air source to turn OFF the air flow.

BRIEF DESCRIPTION OF THE DRAWINGS

The accompanying drawings illustrate certain embodiments discussed below and are a part of the specification.

Throughout the drawings, identical reference characters and descriptions indicate similar, but not necessarily identical elements.

DETAILED DESCRIPTION

Figure 1:
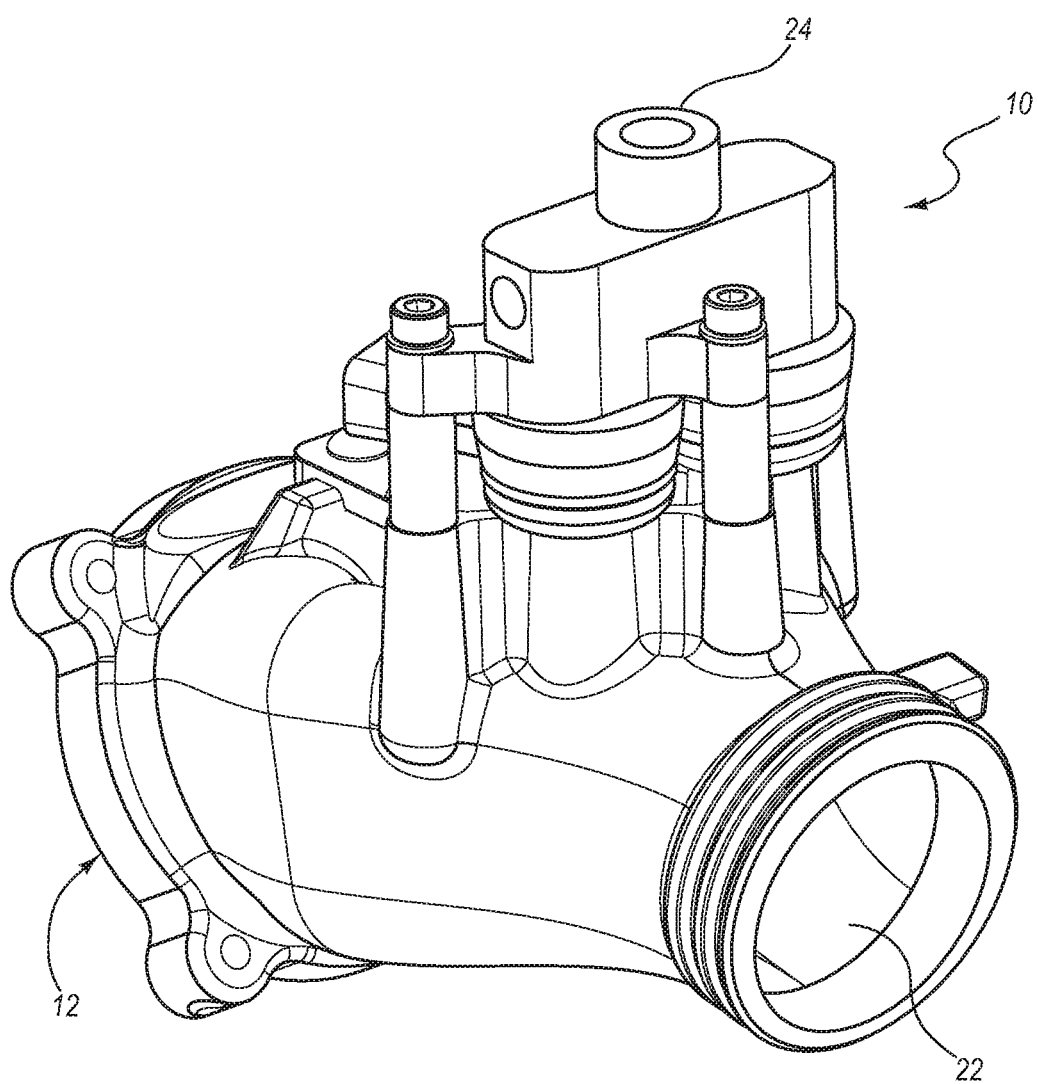
FIG. 1 is a perspective view of an example fuel system in accordance with the present disclosure.

Illustrative embodiments and aspects are described below. It will, of course, be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

As used throughout the specification and claims, the term "droplet" refers to a small sized drop of liquid. The drop of liquid may have any shape and volume. A droplet may include a single drop of the liquid or multiple drops of the liquid combined together, possibly in a serial arrangement. The words "including" and "having," as used in the specification, including the claims, have the same meaning as the word "comprising."

The present disclosure is directed to fuel preparation systems and methods. However, small particle technology has benefits in many applications such as high altitude or low orbit applications and underwater applications. One aspect of the present disclosure relates to the use of multiple physics phenomena to change a liquid state fuel into a fine particle mixture readily convertible into a gaseous state. The change from liquid to gas may occur in a plurality of steps that each utilize a different physics phenomena. For example, a first step may include breaking down a continuous stream of liquid fuel into a plurality of first droplets or strings of connected first droplets by passing the stream of fuel through a single orifice or multiple orifices using liquid energy. In this step, a fluid stream under pressure may be forced through small orifices of, for example, a controlled metering device, to create initial formation of the first droplets. Single or multiple metered streams may be employed to enhance the initial formation of the first droplets and direct the droplets toward the next stage.

In a second step, the first droplets are broken up through mechanical impingement utilizing liquid energy. In this second step, the first droplets or strings of first droplets are impacted against an obstacle such as an impingement surface. This impact results in break up of the first droplets into smaller sized second droplets due to rapid deceleration and considerable droplet deformation. The impingement surface is typically positioned within an optimized distance from the metering device to facilitate the break up of first droplets into smaller second droplets.

In a third step, the film, or droplets leaving the impingement feature, experience a high shear as they enter the surrounding air flow. The shear causes further distortion of the droplets and further break up.

In a fourth step the third droplets are sheared by passing through multiple orifices utilizing gas energy. The third droplets are introduced into an air flow within a mixing chamber to form a two-phase mixture of air and fuel droplets. The two-phase mixture is forced through a secondary plurality of orifices where the third droplets are rapidly accelerated to high velocity (e.g., sonic) speed. The rapid acceleration shears and breaks up the third droplets into smaller sized fourth droplets. Sonic speed is typically in the range of about 768 mph at room temperature or about 330 m/s at 20° C.

The system typically utilizes up to sonic gas velocities to cause droplet breakup. Sonic velocity (or sonic speed) is a function of the fluid properties and conditions. For air at standard sea-level temperature, pressure and humidity conditions, the sonic velocity is about 341 m/s. For compressed air at 4 bar, 350K the sonic velocity is typically about 375 m/s. The system may operate using a range of fluids, temperatures and pressures causing a change in the sonic velocity. However, the ratio of the actual velocity achieved to the sonic velocity (known as the Mach number) should remain relatively constant and may be up to 1.0.

In a fifth step, the fourth droplets are dispersed in a spray pattern in which the fourth droplets are separated from each other. The increased separation between fourth droplets facilitates faster vaporization due to locally steeper vapor concentration gradients wherein there is less interference between vapor clouds of adjacent droplets. A pressure differential present as the fourth droplets are dispensed from the system may also tend to increase vaporization rates of the fourth droplets.

Figure 2:
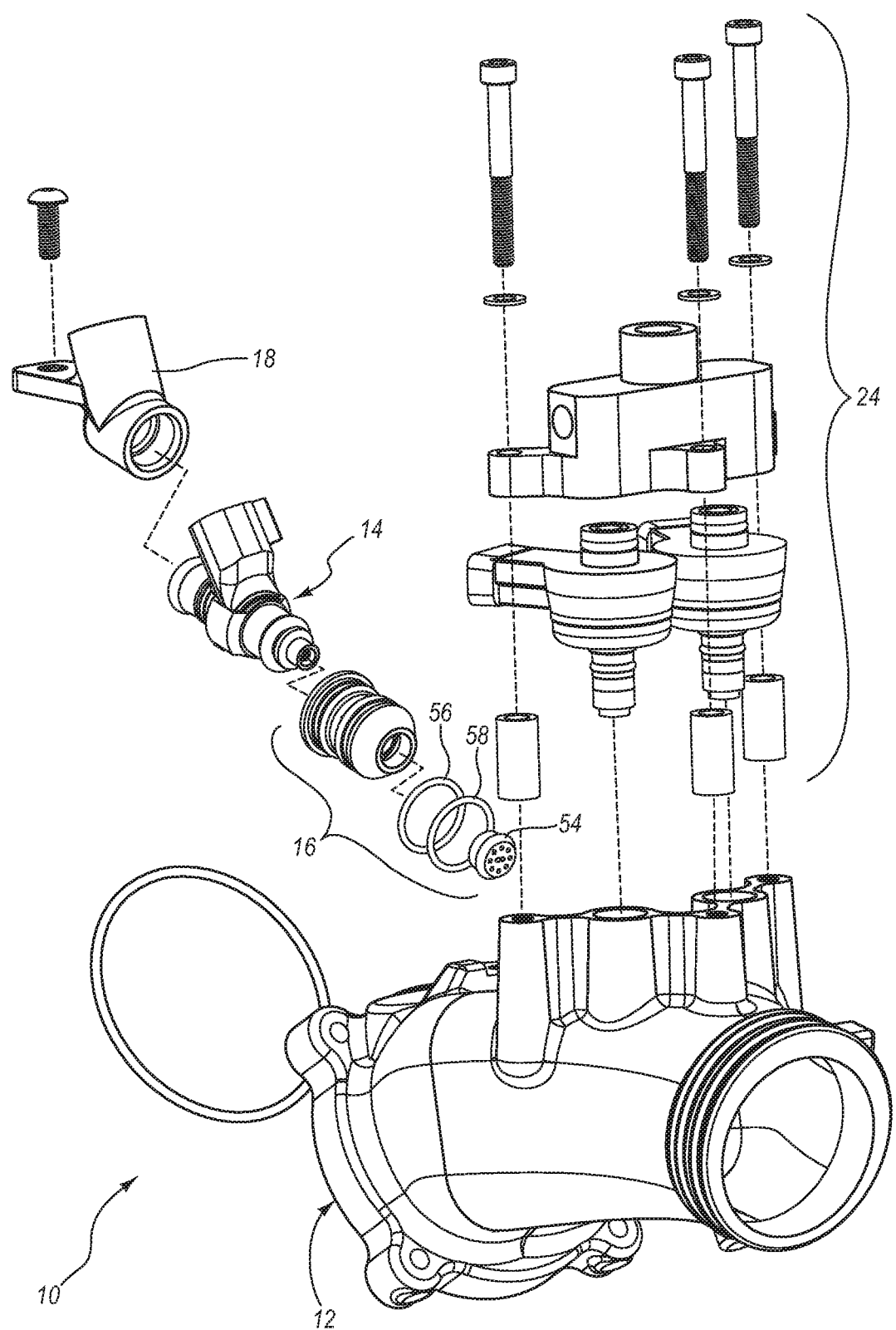
FIG. 2 is an exploded perspective view of the fuel system of FIG. 1.
Figure 3:
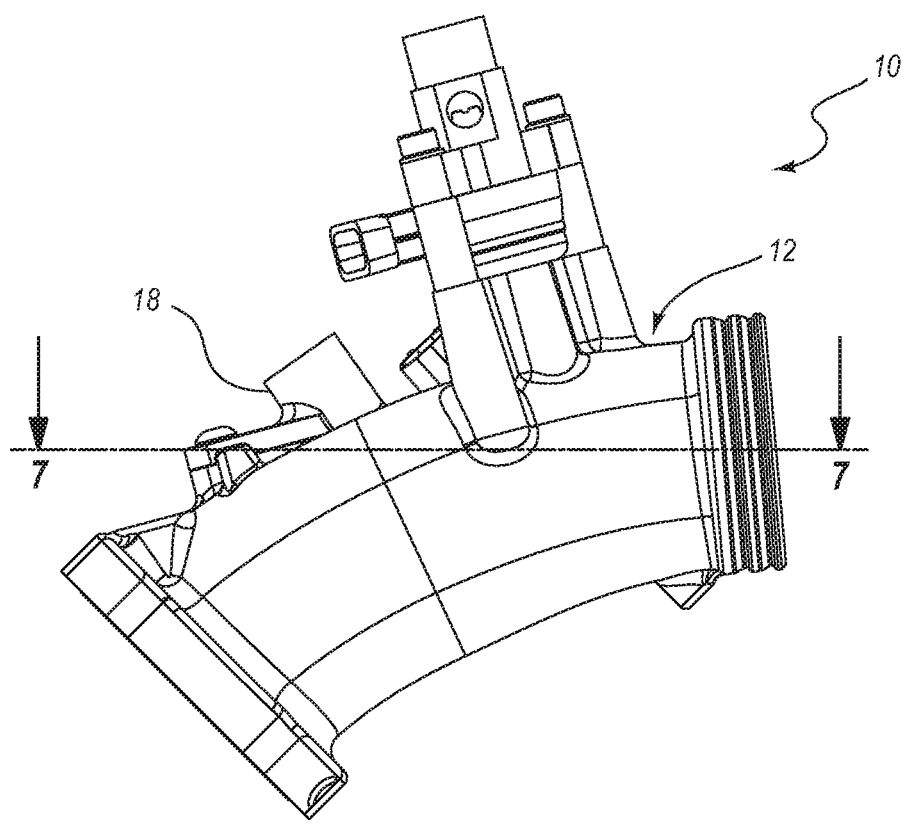
FIG. 3 is a side view of the fuel system of FIG. 1.
Figure 4:
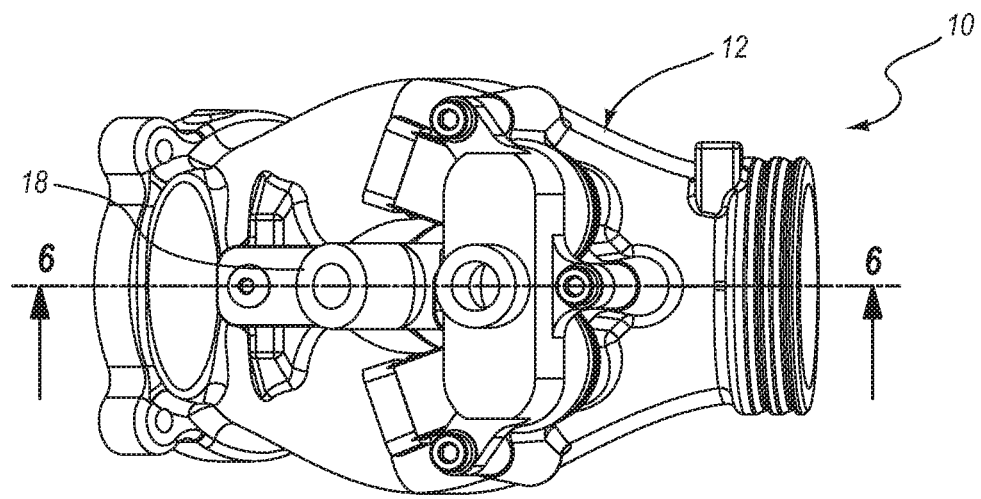
FIG. 4 is a top view of the fuel system of FIG. 1.
Figure 5:
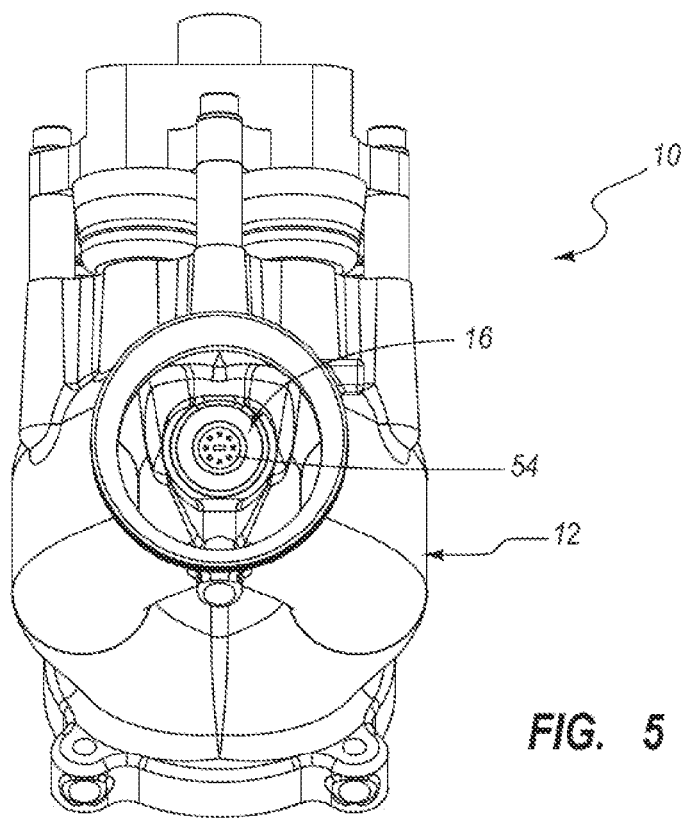
FIG. 5 is a front view of the fuel system of FIG. 1.
Figure 6:
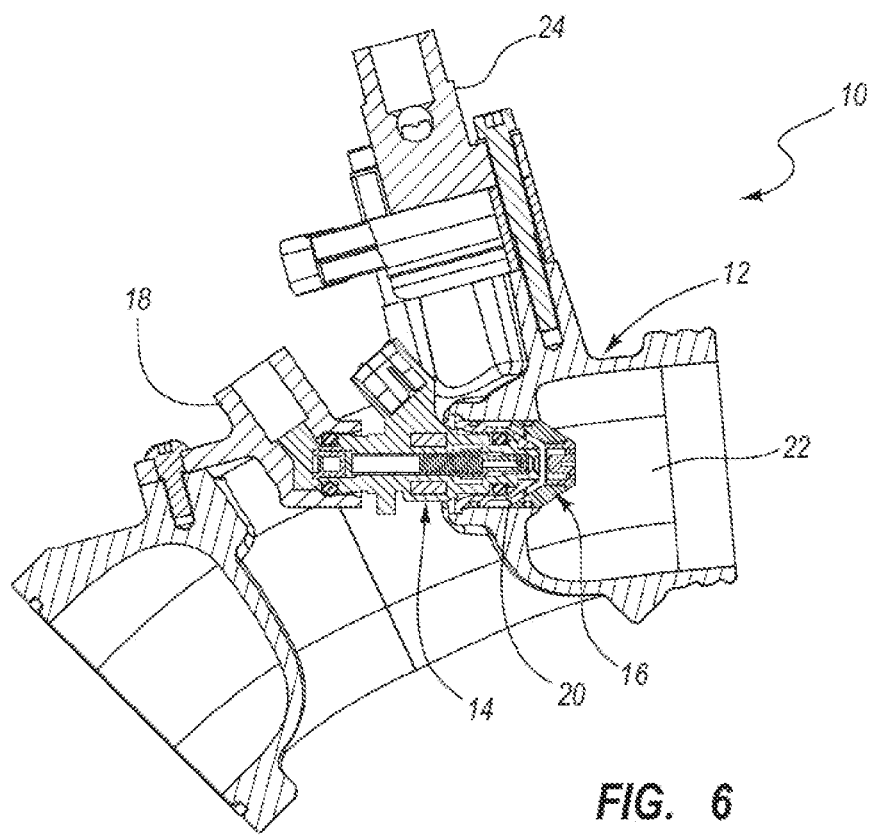
FIG. 6 is a cross-sectional side view of the fuel system of FIG. 4 taken along cross-section indicators 4-4.
Figure 7:
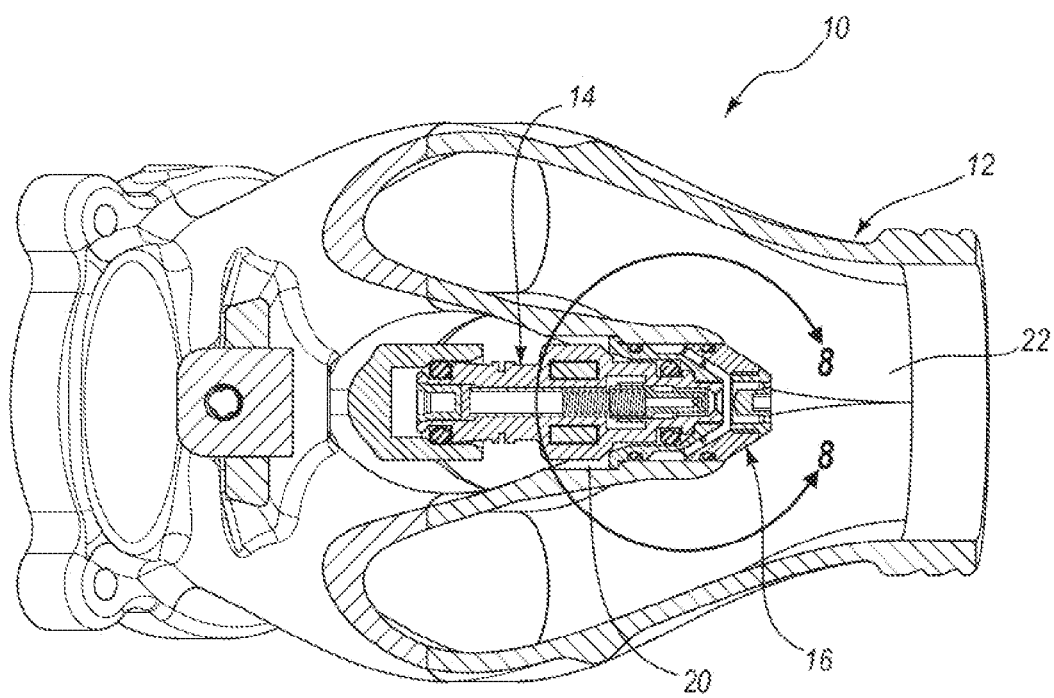
FIG. 7 is a cross-sectional top view of the fuel system of FIG. 3 taken along cross-section indicators 3-3.

Turning now to the figures, and in particular to FIGS. 1-8 and 16-20, one embodiment of a fuel system 10 is shown. The fuel system 10 may comprise, for example, a base 12, a fuel metering device 14, an atomizer 16, and a mounting bracket 18 (as shown in FIG. 2). The fuel system 10 may provide a premixed supply of fuel and oxidant to a device such as, for example, an internal combustion engine. FIG. 1 illustrates the fuel system 10 in a manifold application wherein the base 12 defines at least in part a manifold for use in a combustion engine.

Figure 9:
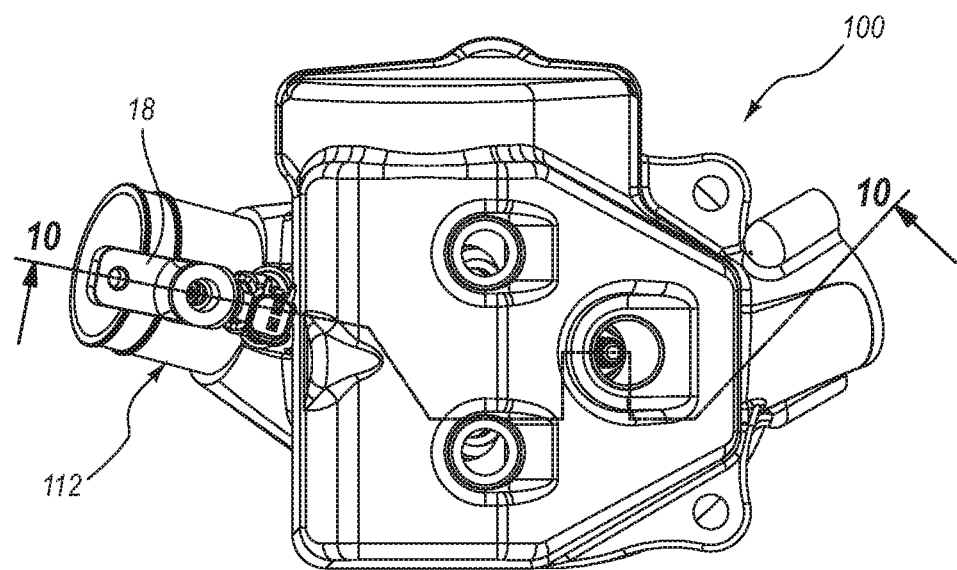
FIG. 9 is a top view of another example fuel system in accordance with the present disclosure.
Figure 10:
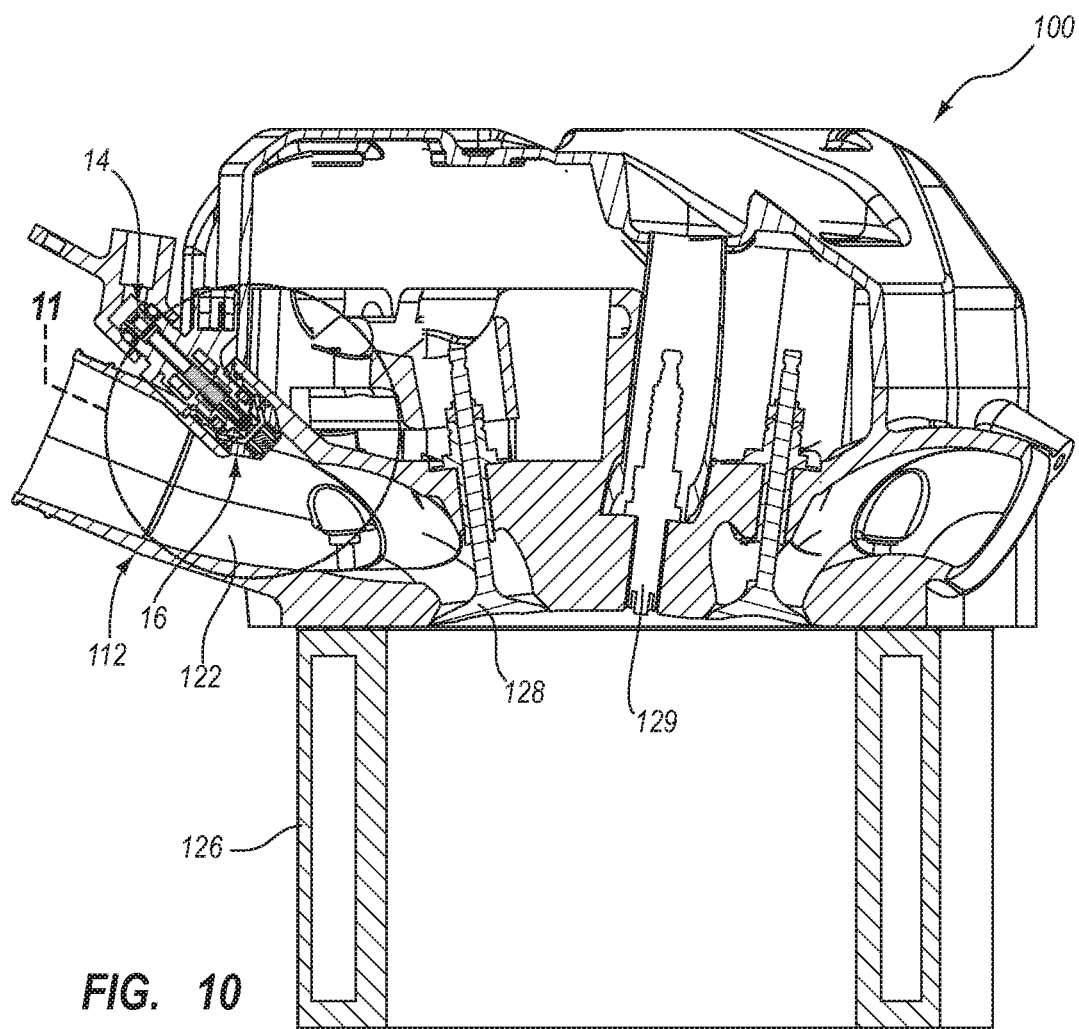
FIG. 10 is a cross-sectional side view of the fuel system of FIG. 9 taken along cross-section indicators 10-10.
Figure 11:
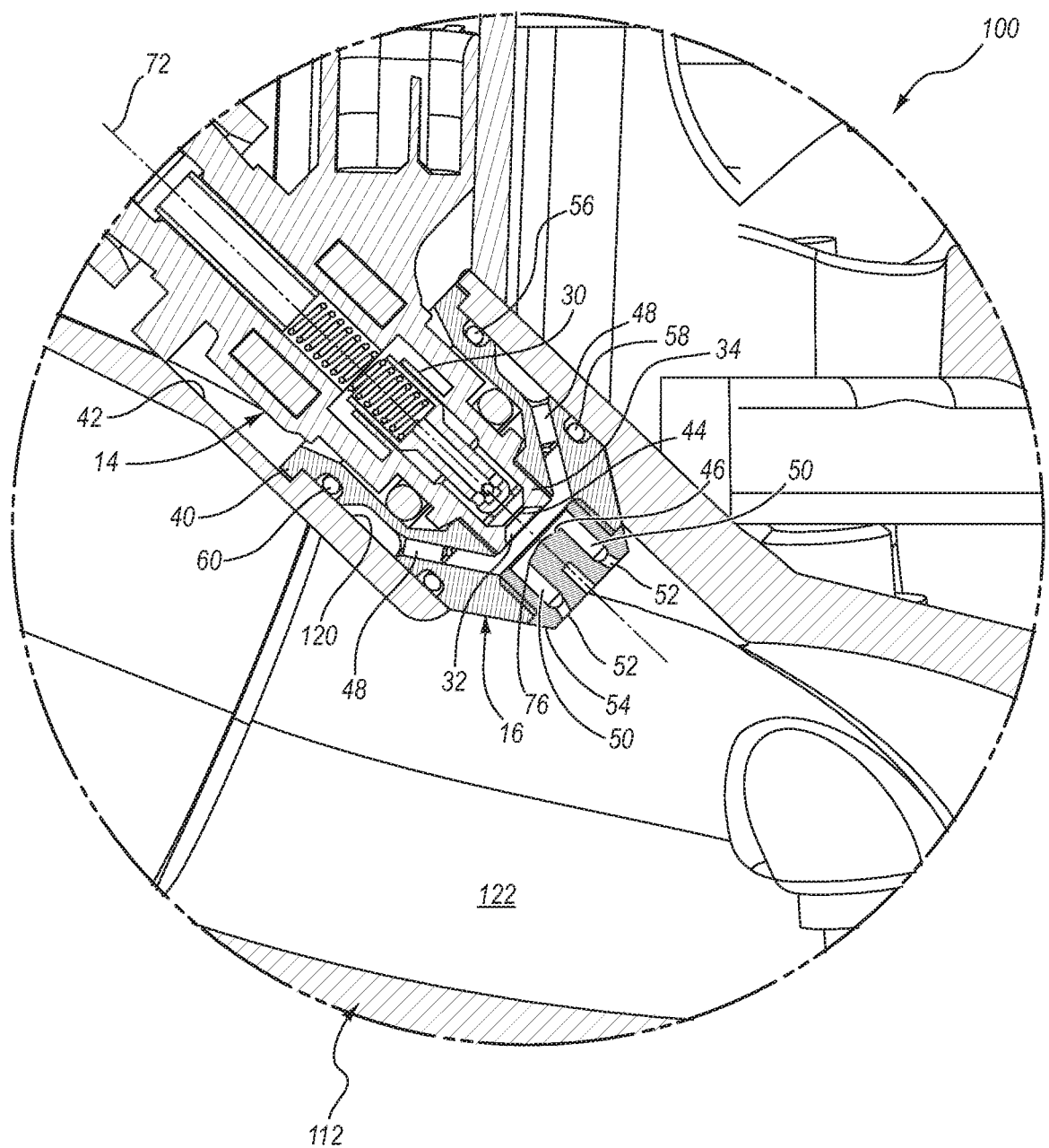
FIG. 11 is a detailed view of a portion of the fuel system shown in FIG. 10.
Figure 12:
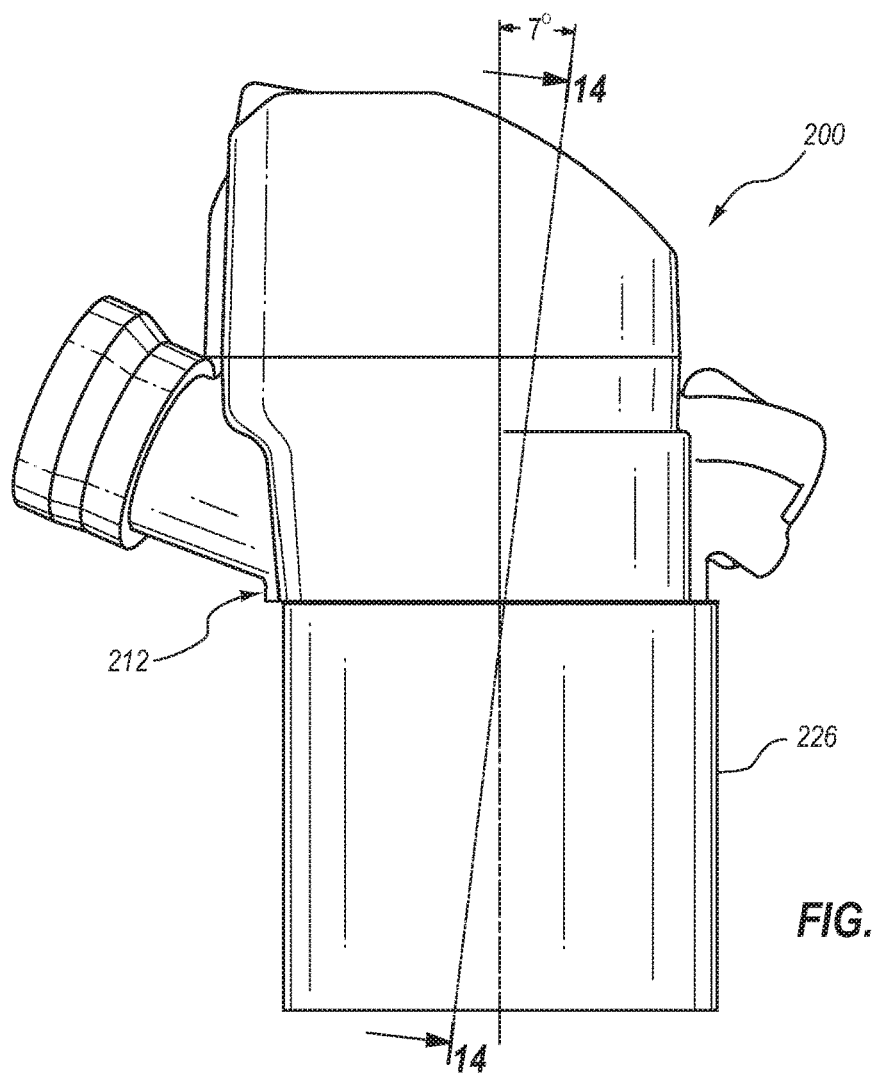
FIG. 12 is a side view of another example fuel system in accordance with the present disclosure.
Figure 13:
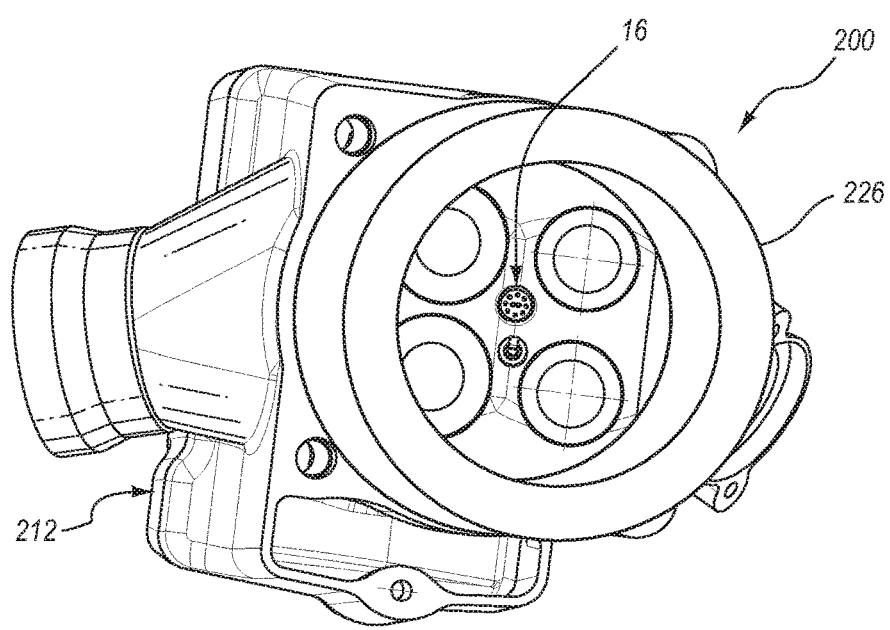
FIG. 13 is a bottom view of the fuel system of FIG. 13.
Figure 14:
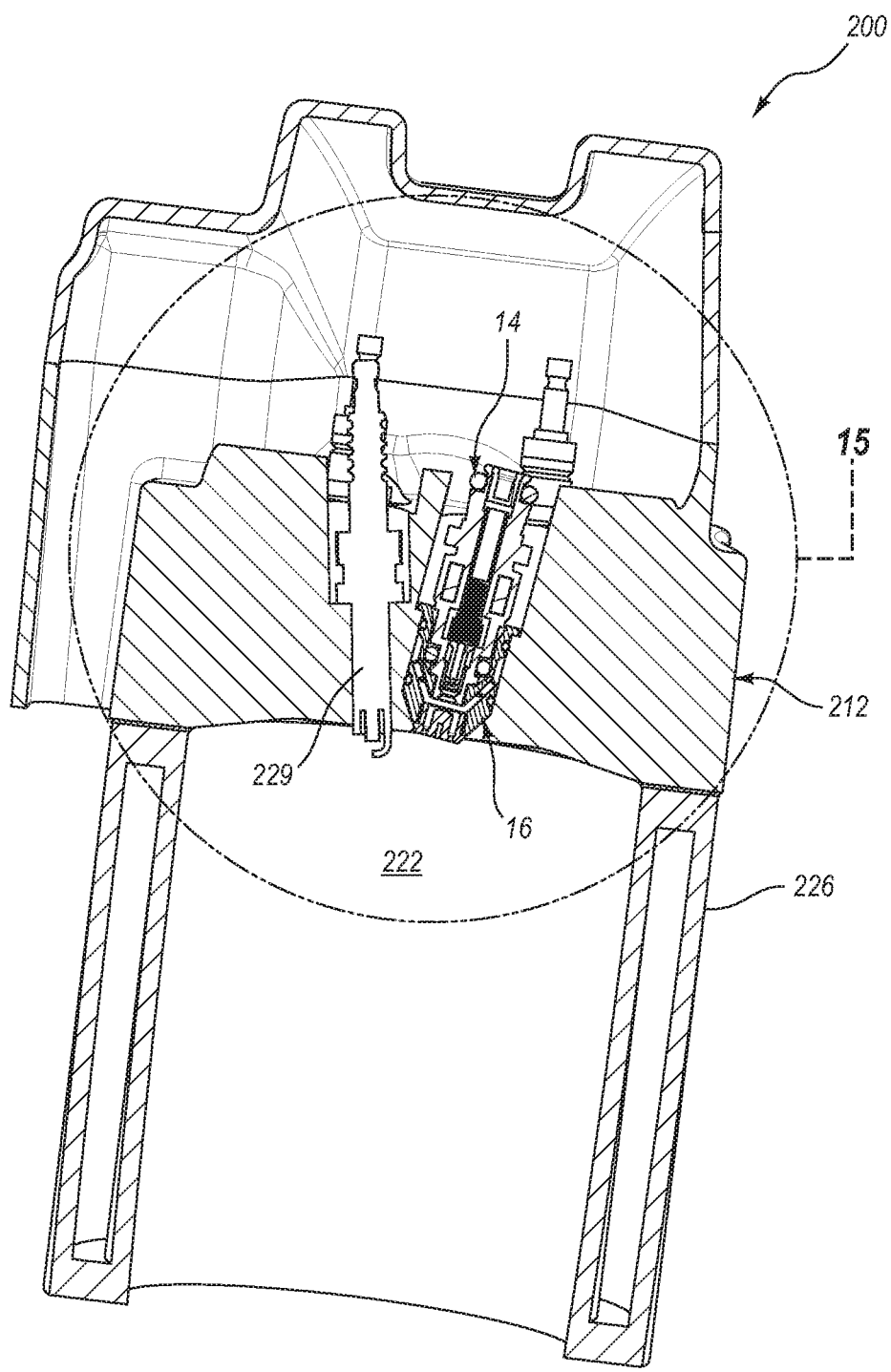
FIG. 14 is a cross-sectional side view of the fuel system of FIG. 12 taken along cross-section indicators 14-14.
Figure 15:
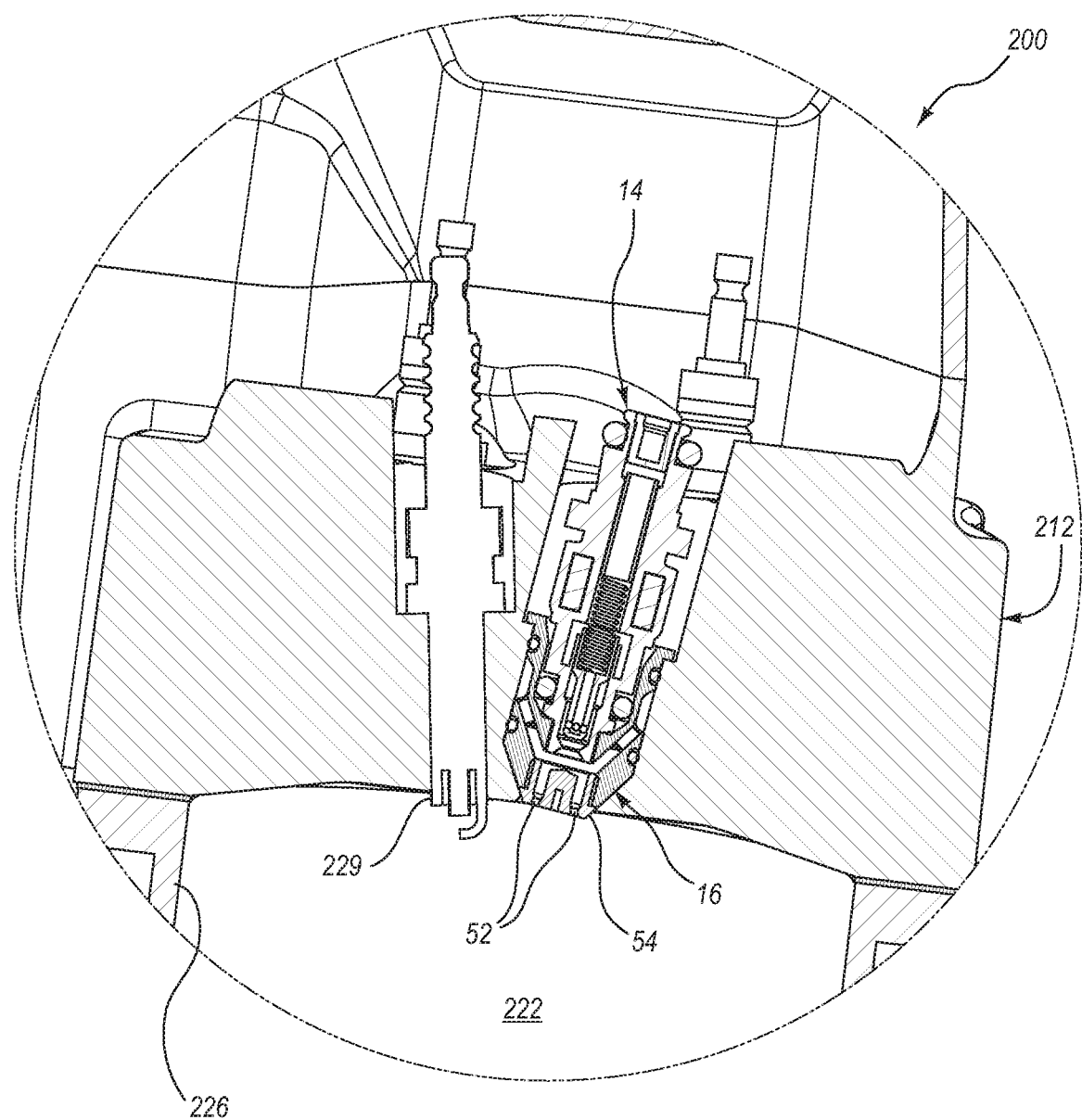
FIG. 15 is a detailed view of a portion of the fuel system of FIG. 14.
Figure 17:
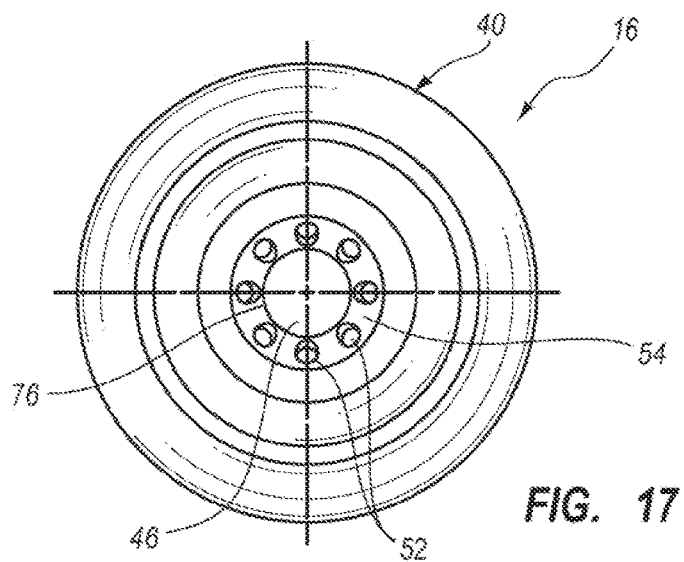
FIG. 17 is a rear view of the atomizer of FIG. 16.
Figure 16:
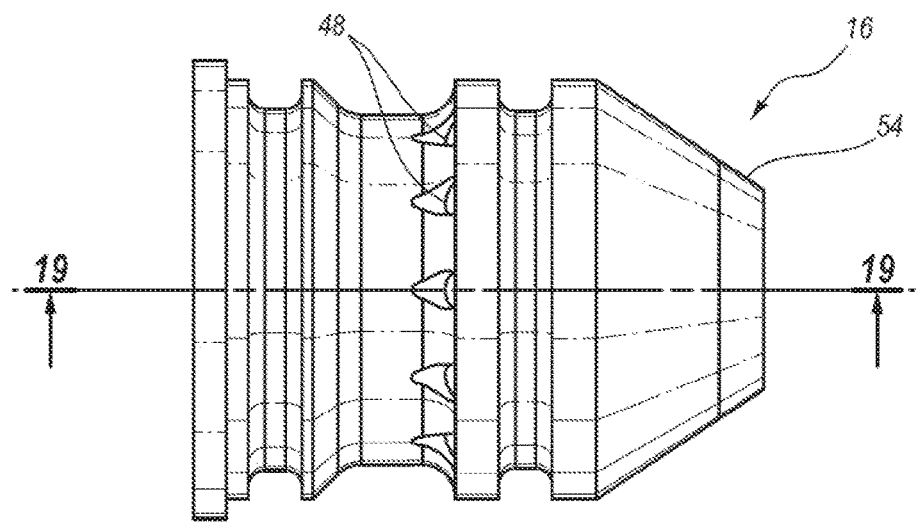
FIG. 16 is a side view of an atomizer of the fuel system of FIG. 1.
Figure 18:
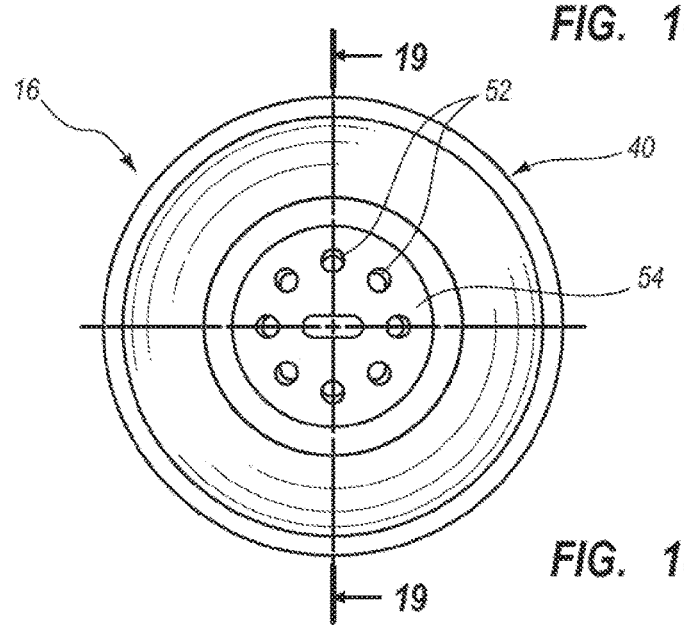
FIG. 18 is a front view of the atomizer of FIG. 16.
Figure 19:
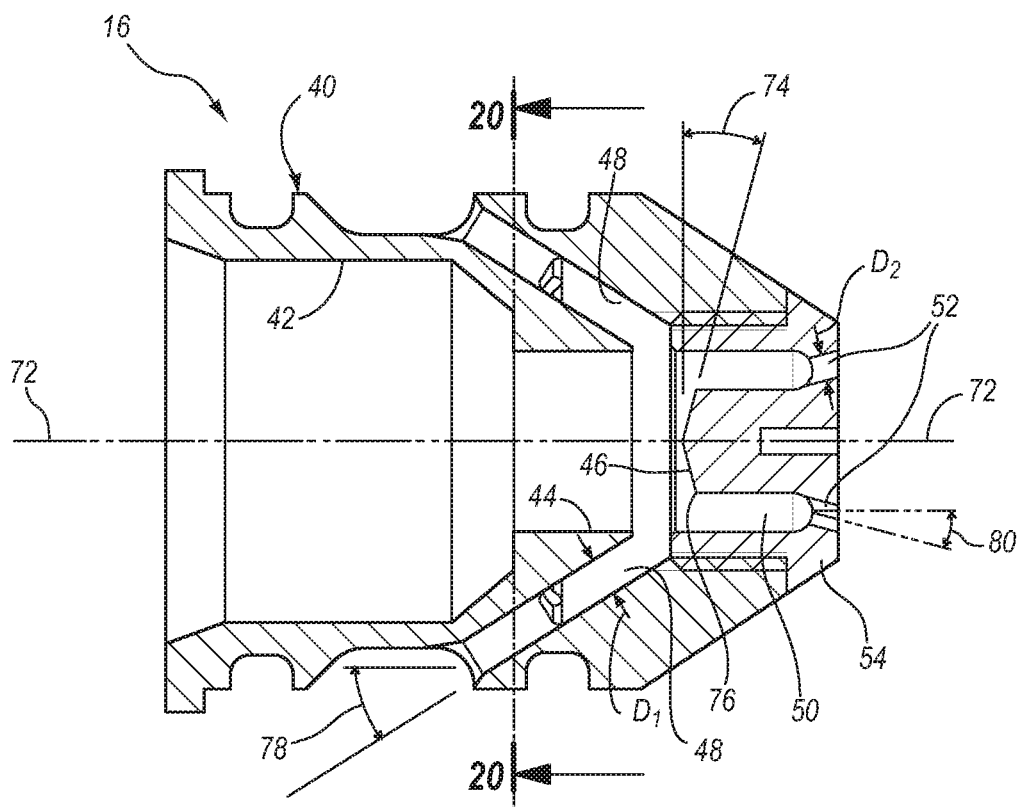
FIG. 19 is a cross-sectional view of the atomizer of FIG. 16 taken along cross-section indicators 19-19.
Figure 20:
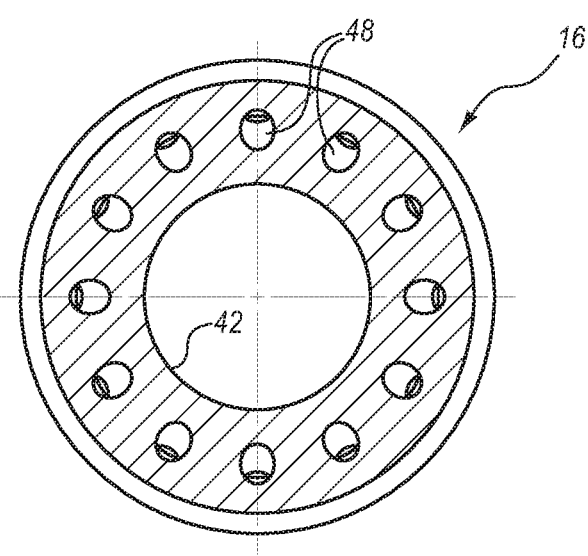
FIG. 20 is a cross-sectional view of the atomizer of FIG. 19 taken along cross-section indicators 20-20.

The base 12 is a generally rigid structure that may be made of metal, ceramic, composite, plastic, or other materials. The base 12 may enclose a number of internal components. The base 12 may include a number of cavities or seat features within which various components are mounted. For example, the base 12 may include an atomizer cavity 20 within which at least a portion of the fuel metering device 14 and atomizer 16 are mounted. The base 12 may also include a dispense cavity 22 wherein the atomizer 16 dispenses a two-phase air/fuel spray. The base 12 may also include an air intake assembly 24 that provides a supply of air to the atomizer 16. The base 12 may comprise any size or shape. The base 12 may be configured in other embodiments in the form of, for example, a base portion of an intake port 112 (see FIGS. 9-11) or a base portion of cylinder head 212 (see FIGS. 12-15) as described in more detail below.

Figure 8:
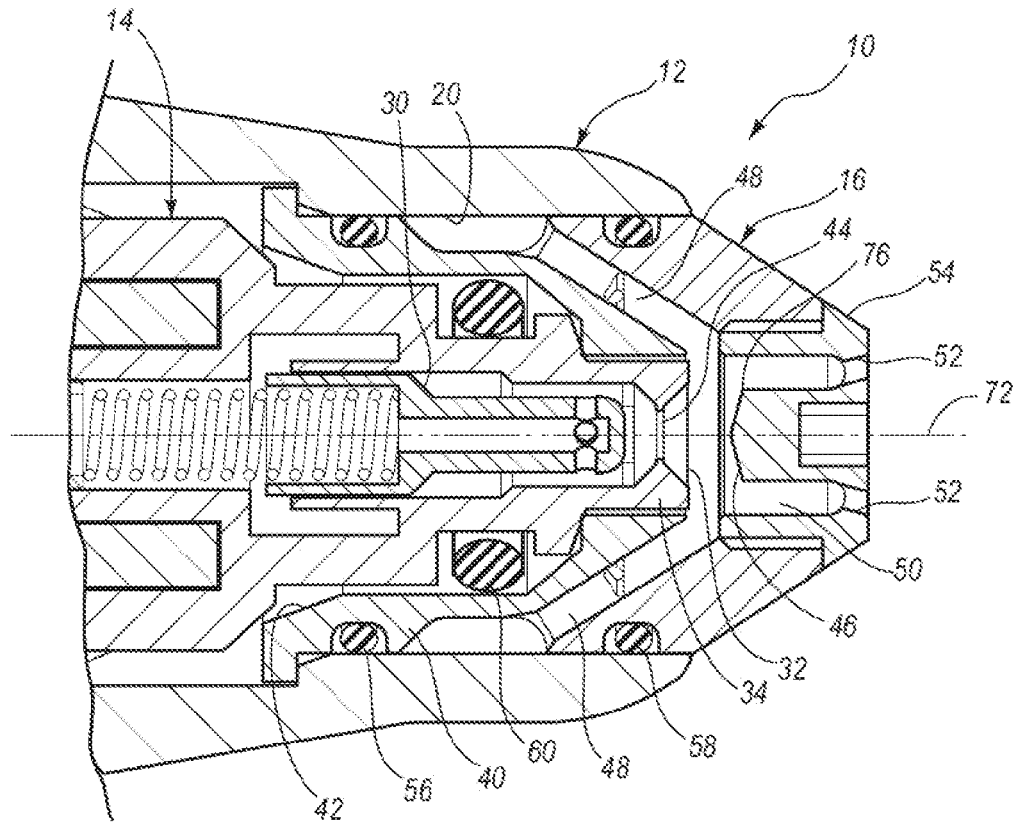
FIG. 8 is a detailed view of a portion of the fuel system of FIG. 7.

Referring to FIGS. 2 and 8, the fuel metering device 14 includes a valve assembly 30 and an outlet 32 positioned at a distal end 34. A fuel metering device 14 may be configured to provide controlled fuel flow to the atomizer 16. The fuel metering device 14 may include at least one orifice that provides break up of a stream of fuel into a plurality of droplets or strings of droplets of fuel. In some examples, the fuel metering device 14 includes a plurality of orifices. A supply of fuel is delivered from the fuel metering device under pressure and forced through a relatively small orifice or orifices for initial formation of droplets. Multiple metered streams of droplets may be created as fuel exits the outlet of the fuel metering device 14. The streams of droplets may be directed toward another portion of the atomizer such as an impingement surface as described in further detail below.

In some embodiments, features of the fuel metering device 14 may be included with the atomizer 16. For example, one or more orifices used to create droplets from the supply of fuel controlled by the fuel metering device 14 may be integrated into the atomizer 16. In other arrangements, features of the atomizer 16 may be integrated into the fuel metering device 14. In some examples, the fuel metering device 14 and atomizer 16 may be integrally formed or assembled as a single device.

The fuel metering device 14 may be an off-the-shelf fuel metering device, fuel injector, or other readily available fuel metering or control device. In at least one example, the fuel metering device 14 may be any device that provides a controlled flow of fuel to the atomizer 16 and directs that flow of fuel onto a surface of the atomizer such as an impingement surface. In one example, the fuel metering device 14 may be a bore hole injector that provides a single stream of droplets or strings of droplets of fuel. In other examples, the fuel metering device 14 provides two or more streams of droplets, a partially broken stream of fuel, or a continuous stream of fuel.

Referring now to FIGS. 2, 8 and 16-20, the atomizer 16 includes a housing 40, a fuel metering device cavity 42, and a fuel inlet 44. The housing 40 is mounted within the atomizer cavity 20 of the base 12. The housing 40 defines the fuel metering device cavity 42, which cavity is sized to receive at least a portion of the fuel metering device 14. First and second pressurized air sealing members 56, 58 may be positioned between the housing 40 and the atomizer cavity 20. A third sealing member 60 may be positioned between the fuel metering device 14 and the fuel metering device cavity 42 within the housing 40. The first and second sealing members 56, 58 may be positioned on opposing sides of an air inlet into the atomizer 16, for example, the air intake assembly 24. The third sealing member 60 may provide a fluid-tight seal between the housing 40 and the atomizer 16.

The atomizer 16 also includes a fuel inlet 44, an impingement surface 46, a plurality of air channels 48, a mixing chamber 50, and a plurality of secondary orifices 52 in the outlet 54. A face of the outlet 54 may be perpendicular to a longitudinal axis of the housing 40, or may be arranged at a non-perpendicular angle relative to the longitudinal axis of the housing 40 to form a conical outlet face that provides a quasi-perpendicular exit face to the secondary orifices 52. The fuel inlet 44 may be positioned in alignment with the outlet 32 of the fuel metering device 14. The fuel inlet 44 may define a single inlet orifice or a plurality of inlet orifices through which the supply of fuel provided by the fuel metering device 14 passes to create droplet break up as the pressurized flow of fuel moves into the atomizer 16.

The impingement surface 46 may be arranged in alignment with the outlet 32 of the fuel metering device 14 and the fuel inlet 44 of the atomizer 16. In some arrangements, the impingement surface 46 is arranged coaxially with the outlet 32. The impingement surface 46 may have a generally conical shape, which may further be diminished to represent a flat (i.e., planar) surface. In at least one example, the impingement surface 46 includes a portion that is arranged at an angle 74 (see FIG. 19) relative to a direction perpendicular to a longitudinal axis 72 of the atomizer 16. Typically the angle 74 is in the range of about 0 degrees to about 60 degrees, and more preferably in the range of about 0 degrees to about 30 degrees. Typically, the smaller the angle 74, the greater amount of impact force exerted when the droplets contact the impingement surface 46 to cause breakup of the droplets. Some of the droplets that contact the impingement surface 46 rebound off of the impingement surface 46 into the mixing chamber 50. The greater the angle 74, the greater the likelihood of deflection of the droplets from the impingement surface 46 with less chance of breakup of the droplet occurring.

The impingement surface 46 is shown having a generally conical shape with linear surfaces. In other arrangements, the impingement surface 46 may have a contoured shape or include portions that are contoured. In some arrangements, the impingement surface 46 may be slightly concave or recessed.

The impingement surface may include at least one surface feature such as a plurality of protrusions, grooves, divots, or other type of irregularity. Providing a surface feature may enhance break up of fuel droplets when contacting the impingement surface 46. The impingement surface may be surface treated or constructed of differing material in support of limiting any surface contour change from the resulting continual impingement.

The impingement surface 46 may include an extended or enhanced edge 76 having overhanging, serrated or other features. Fuel droplets or portions of fuel droplets that contact the impingement surface 46 may move along the impingement surface 46 to the edge 76 where the droplets are further broken up at the edge 76 as the droplets move into the mixing chamber 50. In some arrangements, a thin film of droplets of fuel may collect along the impingement surface 46 and move radially outward to the edge 76 where the droplets are broken up into smaller sized droplets. The creation of a thin film of fuel may occur coincidentally with breakup of droplets upon impact of the impingement surface 46 and rebounding of droplets of various sizes after contacting the impingement surface 46.

The impingement surface 46 may have any sized or shaped construction. Any portion of the impingement surface 46 may any desired orientation relative to the fuel metering device 14 and longitudinal axis 72 of the atomizer 16.

The pressurized air channels 48 of the atomizer 16 may be radially spaced apart around the impingement surface 46 to provide a flow of air to the mixing chamber 50 and areas surrounding the impingement surface 46. The air channels 48 may extend to an outer periphery of the atomizer 16 where a supply of pressurized air is provided via, for example, the air intake assembly 24 (see FIG. 6). The air channels 48 may be arranged at an angle 78 relative to the longitudinal axis 72 (see FIG. 19). The air channels 48 may have a maximum dimension $D_1$ (i.e. maximum diameter). The amount of air delivered to the mixing chamber 50 may be determined at least in part by the number of air channels 48 and the dimension $D_1$. The angle 78 is typically in the range of about 30 degrees to about 90 degrees, and more preferably in the range of about 30 to about 60 degrees. The dimension $D_1$ is typically in the range of about 0.5 mm to about 5 mm, and more preferably in the range of about 1 mm to about 2 mm.

In addition to being arranged at an angle 78 relative to the longitudinal axis 72, the air channels 48 may also be arranged at an angle relative to a tangent at an outer surface of the atomizer 16. That is to say, the air channels 48 may comprise an angle from tangent greater than 0 degrees and less than 90 degrees, wherein 90 degrees is aligned radial or centered. This additional angled relationship of the air channels 48 may provide a compound angle for the air channels 48 and may assist in providing a helical rotation to the exiting air, thereby generating swirling or vortex effect within the mixing chamber 50. The vortex effect near the impingement surface may enhance break up, as well as assist in enhancing evacuation of residual particles during fuel purge, whereas the vortex effect in the annulus region may enhance uniformity of two-phase air/fuel mixture distribution from the secondary outlet orifices. An example device that implements vortex chambers within a fuel mixing chamber is disclosed in U.S. Published Patent Application No. 2007/0169760, which is incorporated herein in its entirety by this reference.

The mixing chamber 50 may be defined at least in part surrounding the impingement surface 46 radially outward from the impingement surface 46. The mixing chamber 50 may also include an area within the atomizer 16 defined between the impingement surface 46 and the fuel inlet 44. The mixing chamber 50 may be a continuous chamber and may extend axially away from the impingement surface 46 toward the outlet 54. The mixing chamber 50 may define a flow path for a mixture of air and fuel droplets to travel toward the secondary orifices 52 at the outlet 54. Typically, the mixing chamber 50 is sized and arranged to provide a space within which a flow of air provided through the air channels 48 may mix with fuel droplets (i.e., at least those fuel droplets that have been broken up upon contact with the impingement surface 46) to create an air/fuel mixture.

The impingement surface 46 may be defined as a structure that extends or protrudes into the mixing chamber 50. Alternatively, the mixing chamber 50 may be defined as a space such as a cylindrical cavity or annulus that is defined around an impingement surface and the structure that defines and supports the impingement surface 46. The bottom of the annulus may be planar or contoured to support enhanced fuel purge.

The secondary orifices 52 may be positioned at an outlet 54 of the atomizer 16. The secondary orifices 52 may be positioned radially and circumferentially spaced apart. The secondary orifices 52 may each individually have a maximum dimension $D_2$ (e.g., maximum diameter) and be arranged at an angle 80 (see FIG. 19). The collective cross-sectional area defined by the secondary orifices 52 is typically less than the cross-sectional area of the mixing chamber 50 (e.g., cross-sectional area at the interface between the mixing chamber 50 and the secondary orifices 52). Consequently, fluids under pressure located within the mixing chamber 50 tend to accelerate as they move into and through the secondary orifices 52. In at least some examples, the two-phase air/fuel mixture present in the mixing chamber 50 accelerates to high velocity (e.g., sonic) speeds while passing through the secondary orifices 52. This rapid acceleration tends to break up the fuel droplets in the fuel/air mixture to form a plurality of smaller-sized fuel droplets. Contacting the fuel droplets against the entrance into and sidewalls of the smaller sized secondary orifices 52 may physically break up at least some of the droplets of the air/fuel mixture.

The dimension $D_2$ is typically in the range of about 0.2 mm to about 3 mm and more preferably in the range of about 0.5 mm to about 1.5 m. Typically, the angle 80 is in the range of about 0 degrees to about 45 degrees relative to the longitudinal axis 72, and more preferably in the range of about 0 degrees to about 20 degrees. The angled arrangement of the secondary orifices 52 tends to disperse the fuel mixture to separate the fuel droplets as they exit the outlet 54. This dispersion of the fuel droplets creates additional separation between the droplets that may accelerate vaporization due to locally steeper vapor concentration gradients available because the vapor clouds surrounding each of the droplets have less interference with each other.

The outlet 54 of the atomizer 16 may be constructed as a separate piece that is mounted to the housing 40 in a separate step. FIGS. 2 and 19 illustrate the construction of outlet 54 as a separate piece. In other arrangements, the outlet 54 may be integrally formed with the housing 40. Typically, the outlet 54 defines at least a portion of the secondary orifices 52. In some arrangements, the outlet 54 when formed as a separate piece from the housing 40, can be exchanged with an outlet having different sized and angled secondary orifices 52. Different sized and angled secondary orifices 52 may be more useful for a given fuel being handled by the fuel system 10. The number of secondary orifices 52 is typically in the range of about 2 to about 20, and more preferably in the range of about 6 to about 12. The number and relative positioning of secondary orifices 52 may provide certain advantages in disbursing the fuel droplets.

Referring now to FIGS. 9-11, another example fuel system 100 is shown. The fuel system 100 includes a base 112 that is constructed as an intake port to an engine cylinder head. The base 112 includes an atomizer cavity 120, a dispense cavity 122, and a cylinder 126. A valve 128 and ignition member 129 are exposed within the cylinder 126. Dispensed fuel from an atomizer 16 is delivered from the dispense cavity 122 and then into the cylinder 126 where the fuel is ignited by the ignition member after piston compression 129.

Referring now to FIGS. 12-15, another example fuel system 200 is shown. Fuel system 200 is constructed as a direct injection system wherein the base 212, which is constructed as a cylinder head, is mounted to a cylinder 226. The base 212 includes an atomizer cavity 220 and a dispense cavity 222. An ignition member 229 is exposed within the cylinder 226. Fuel dispensed from the atomizer 16 directly into the cylinder 226 is ignited by the ignition member 229 after piston compression.

Other types of fuel systems may benefit from the use of a fuel metering device and atomizer as described herein. The fuel systems described herein may be compatible with many different types of fuel such as, for example, gasoline, diesel fuel and liquid propane. The relatively simple construction of the atomizer, which implements basic physics phenomena related to liquid and gas energy, orifices, physical impingement, pressure differentials, vaporization, rapid acceleration, supersonic speeds, and other considerations may promote certain advantages such as, for example, improved vaporization of fuel at lower pressures, higher fuel flow rates for a given particle size, reduced complexity in design and manufacturing thereby reducing costs, and less stringent tolerances as compared to other systems like direct injection fuel injectors.

The use of multiple physical mechanisms to break up fuel into smaller sized droplets in sequential order may assist in sequentially breaking the droplets into smaller sizes to enhance the rate of evaporation after dispensing from the atomizer. The rate of evaporation of a fuel droplet increases exponentially as the diameter of the droplet decreases. The rate of diffusion from the droplet to the liquid vapor interface between the liquid core and vapor surrounding the fuel droplet may be expressed by the following Equation 1:

$$m_{liquid} = 4\pi \rho r_i D_{liquid-vapor} \ln\left[\frac{1 - Y_{liquid,m}}{1 - Y_{liquid,i}}\right] \quad \text{Equation 1}$$

$Y_{liquid,m}$=Mass fraction of vapor far from the surface
$Y_{liquid,i}$=Mass fraction of vapor at the liquid/vapor interface
$m_{liquid}$=Mass transfer rate of liquid
$D_{liquid-vapor}$=Mass diffusivity
$\rho$=density of the liquid
$r_i$=radius of droplet
$\pi$=3.141593

Referring now to FIG. 21-29, an example method of dispensing fuel with a fuel system is shown and described. The fuel system 10 is referenced throughout FIG. 21-29. Other fuel system embodiments such as fuel systems 100, 200 may be operated similarly.

Figure 21:
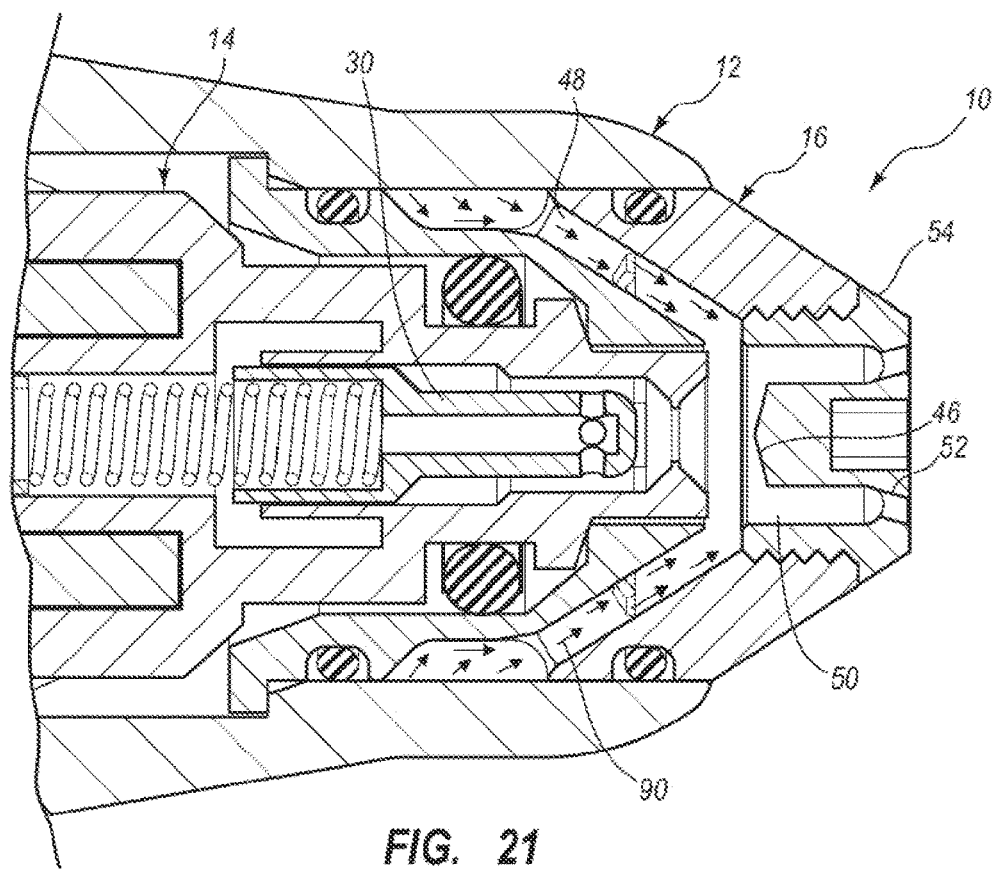
FIG. 21 demonstrates a pressurization stage of operation of the fuel system of FIG. 1.
Figure 22:
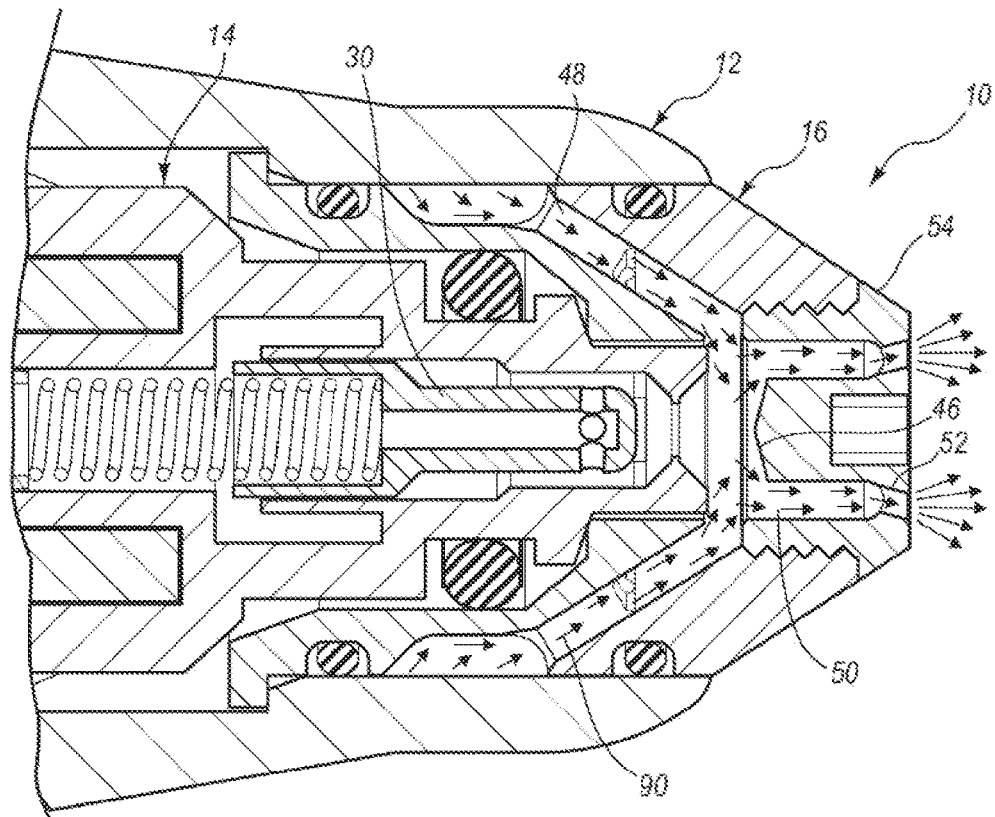
FIG. 22 demonstrates further development of the pressurization stage of FIG. 21.

The method is initiated by creating air pressure within the atomizer 16 by turning ON an air supply while maintaining the fuel supply OFF, as shown in FIGS. 21 and 22. This step may also be referred to as pressurizing the atomizer 16. After sufficient air pressure is obtained within the atomizer 16, excess air flow passes through the secondary orifices 52 out of the outlet 54. The airflow 90 may be referenced as a plurality of arrows 90.

Figure 23:
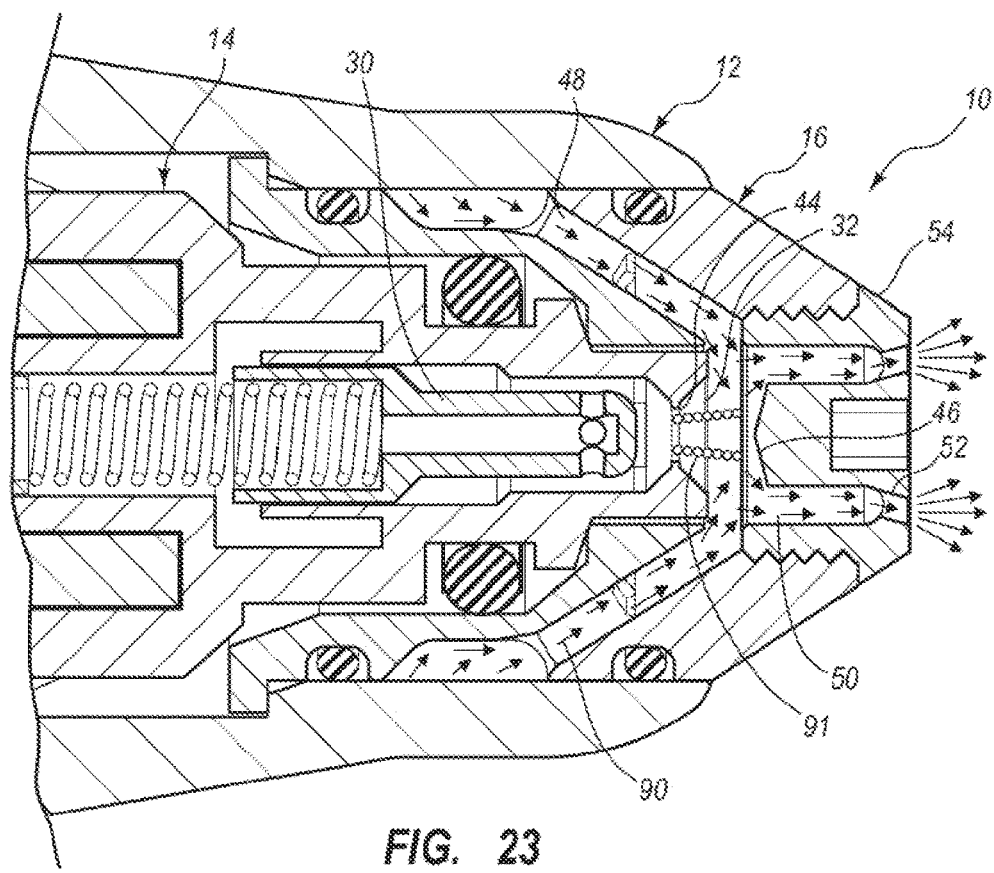
FIG. 23 demonstrates a first orifice break up stage of operation of the fuel system of FIG. 1.
Figure 24:
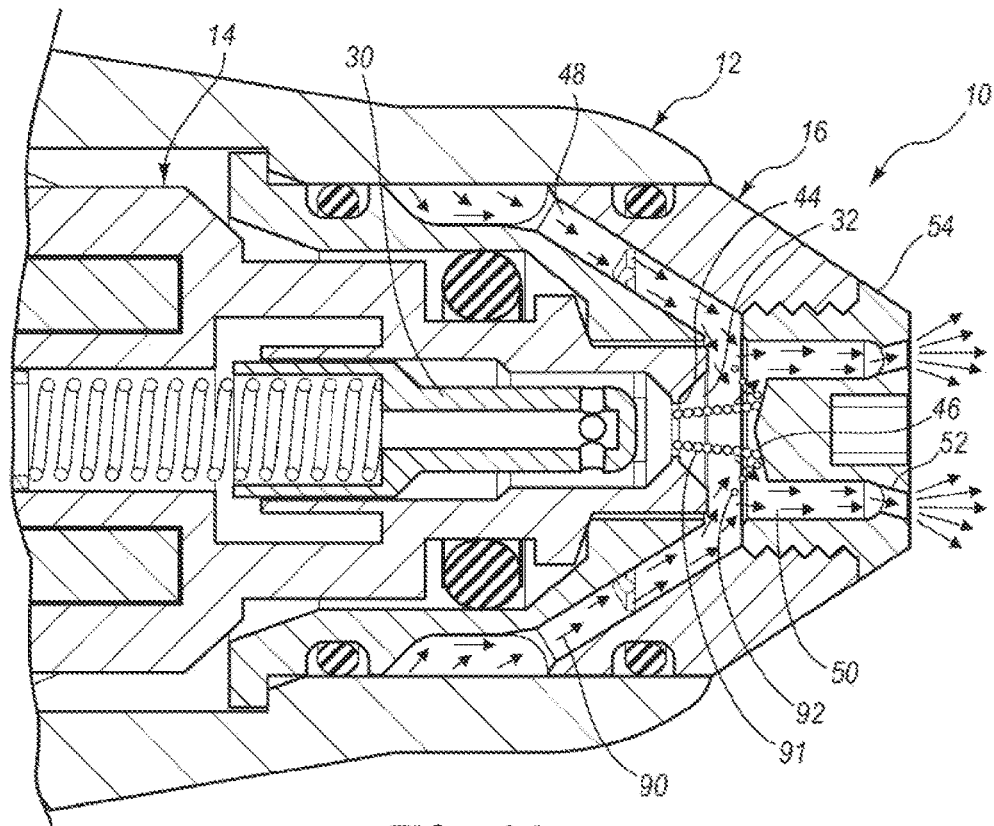
FIG. 24 demonstrates an impingement break up stage of operation of the fuel system of FIG. 1.

In a following operation step, while maintaining the airflow ON, a supply of fuel is turned ON and delivered by the fuel metering device 14 into the atomizer 16. The supply of fuel is in the form of at least one stream of a plurality of fuel droplets or a string of fuel droplets that are directed toward the impingement surface 46 as shown in FIG. 23. Upon contacting the impingement surface, the first fuel droplets 91 are broken up into smaller second droplets 92 as shown in FIG. 24.

Figure 25:
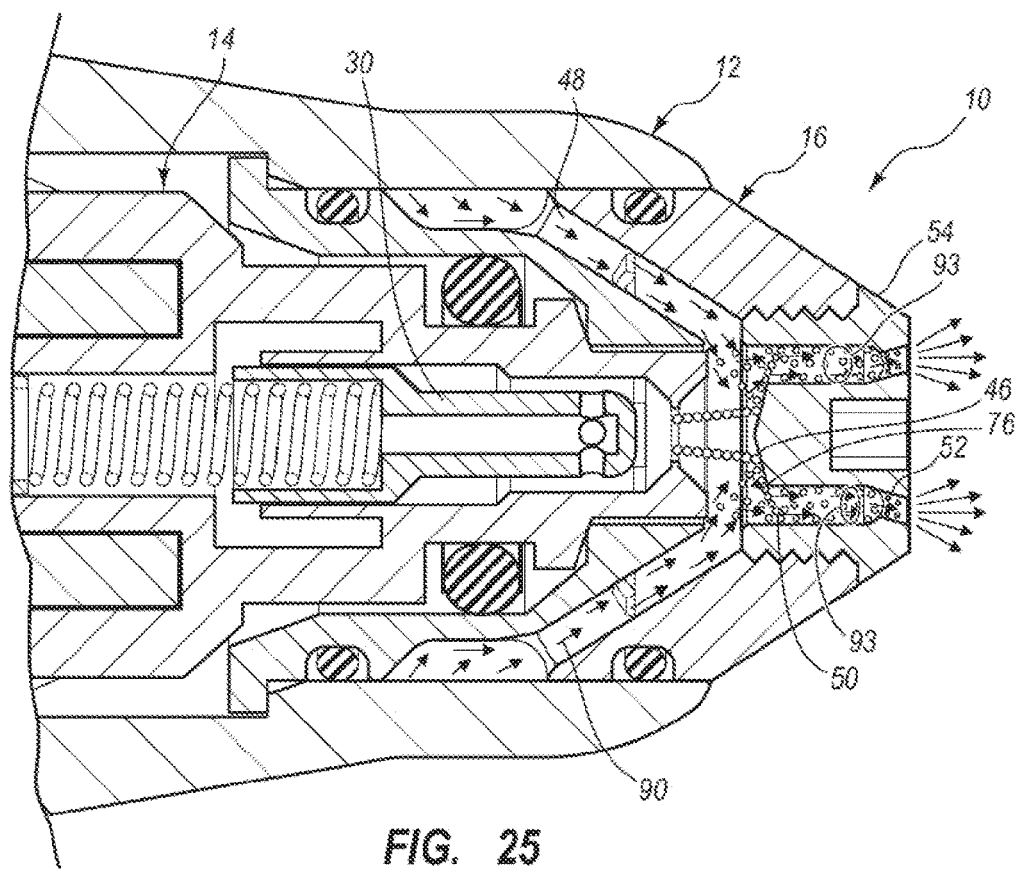
FIG. 25 demonstrates a thin film break up stage of operation of the fuel system of FIG. 1.
Figure 26:
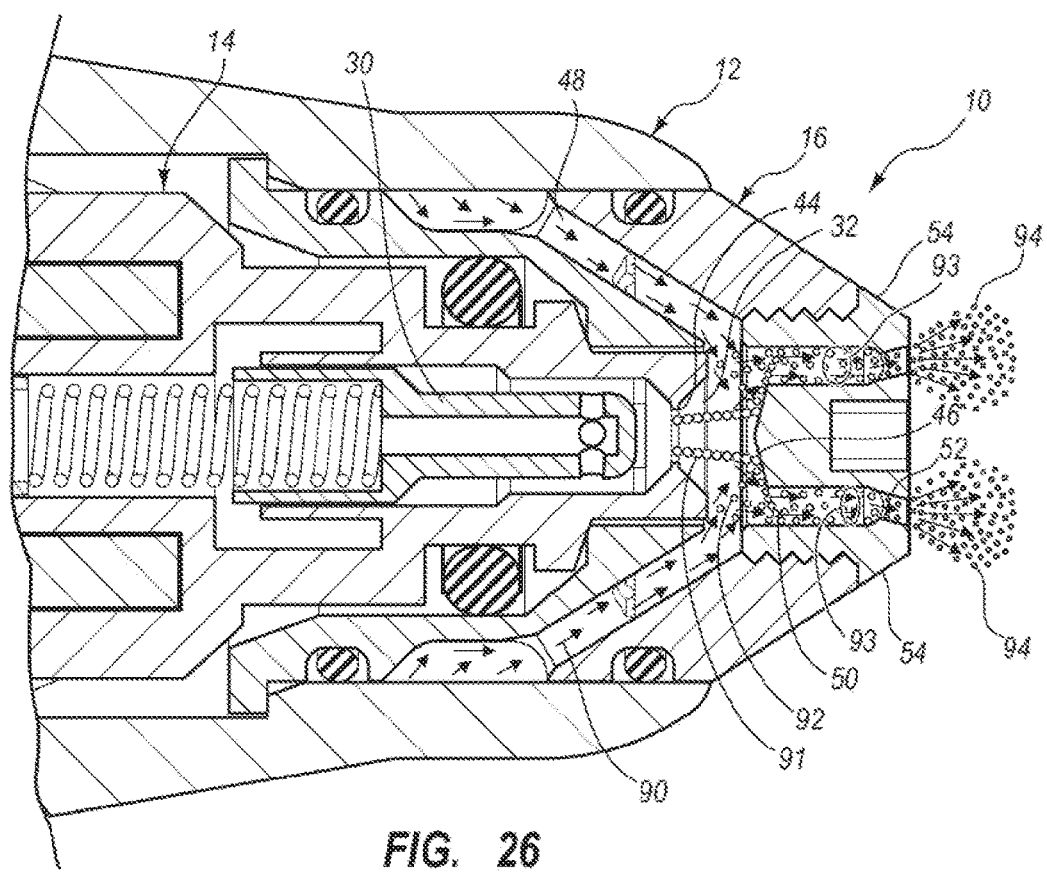
FIG. 26 demonstrates a sonic velocity break up stage of operation of the fuel system of FIG. 1.

A thin film of second droplets may collect on the impingement surface 46 as shown in FIG. 25. Additional fracturing of the first and second droplets 91, 92 may occur as the thin film travels over the edge 76 of the impingement surface 46. The second droplets 92 mix with the airflow 90 to create a two-part mixture of air and second droplets within the mixing chamber 50. The fuel/air mixture moves under pressure towards the secondary orifices 52, wherein rapid acceleration occurs to increase the speed of the second droplets. The second droplets may reach supersonic speeds. As the second droplets 92 pass through the secondary orifices 52, the second droplets 92 are broken up into smaller sized third droplets 94 that are dispersed at the outlet 54 as shown in FIG. 26. As the third droplets 94 are dispersed from the atomizer 16, the third droplets may separate from each other. An vaporization rate for the third droplets may increase as the third droplets 94 continue to reduce in size.

Figure 27:
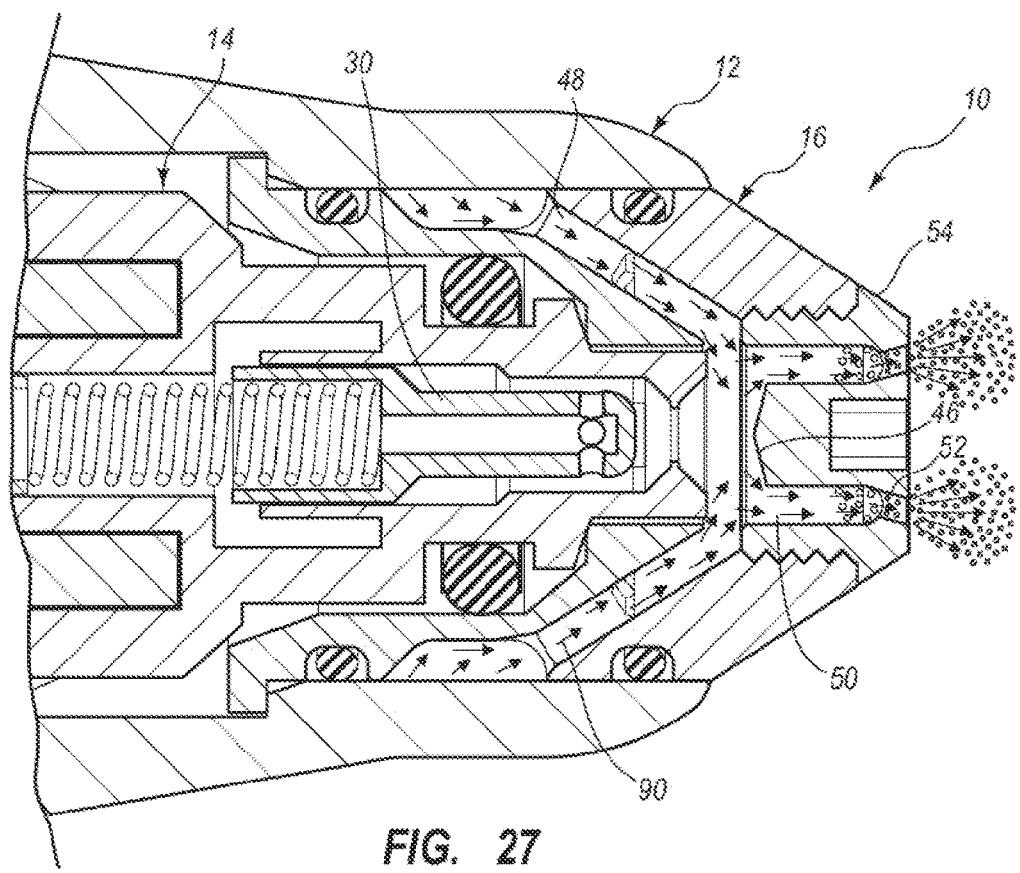
FIG. 27 demonstrates a fuel purge stage of operation of the fuel system of FIG. 1.

In a further operation step, the fuel is turned OFF while the airflow is maintained ON, as shown in FIG. 27. This step may be referred to as a fuel purge as the airflow carries any remaining fuel within the atomizer 16 out through the outlet 54.

Figure 28:
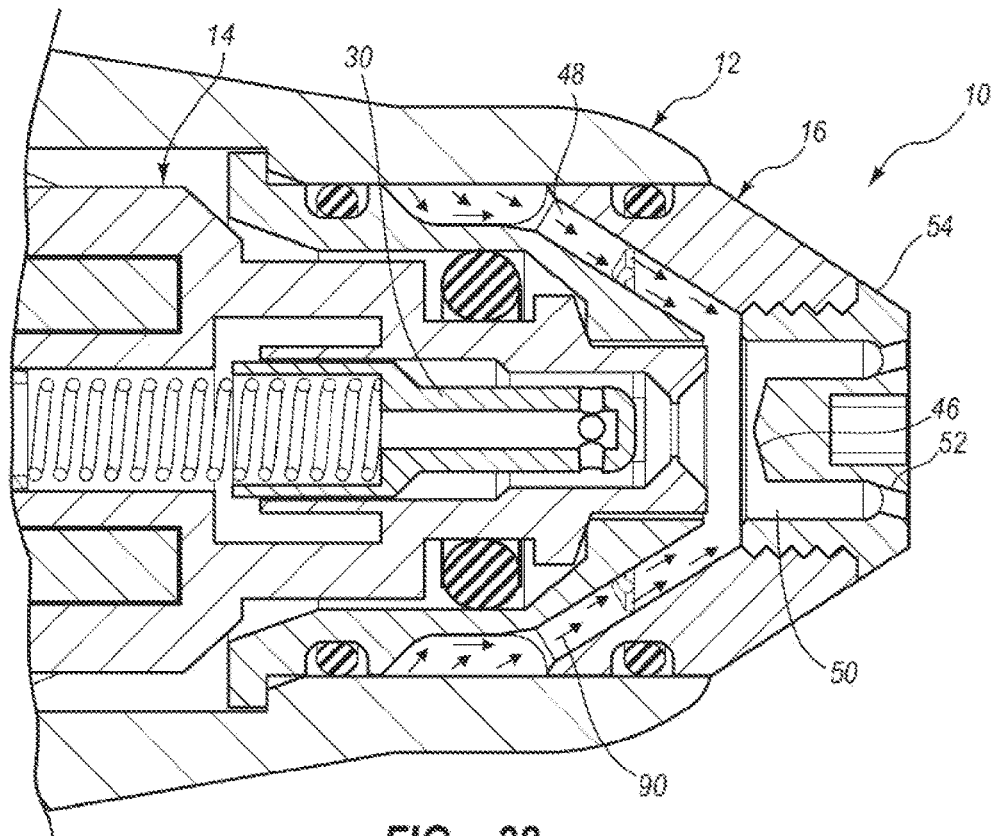
FIG. 28 demonstrates an air evacuation stage of operation of the fuel system of FIG. 1.
Figure 29:
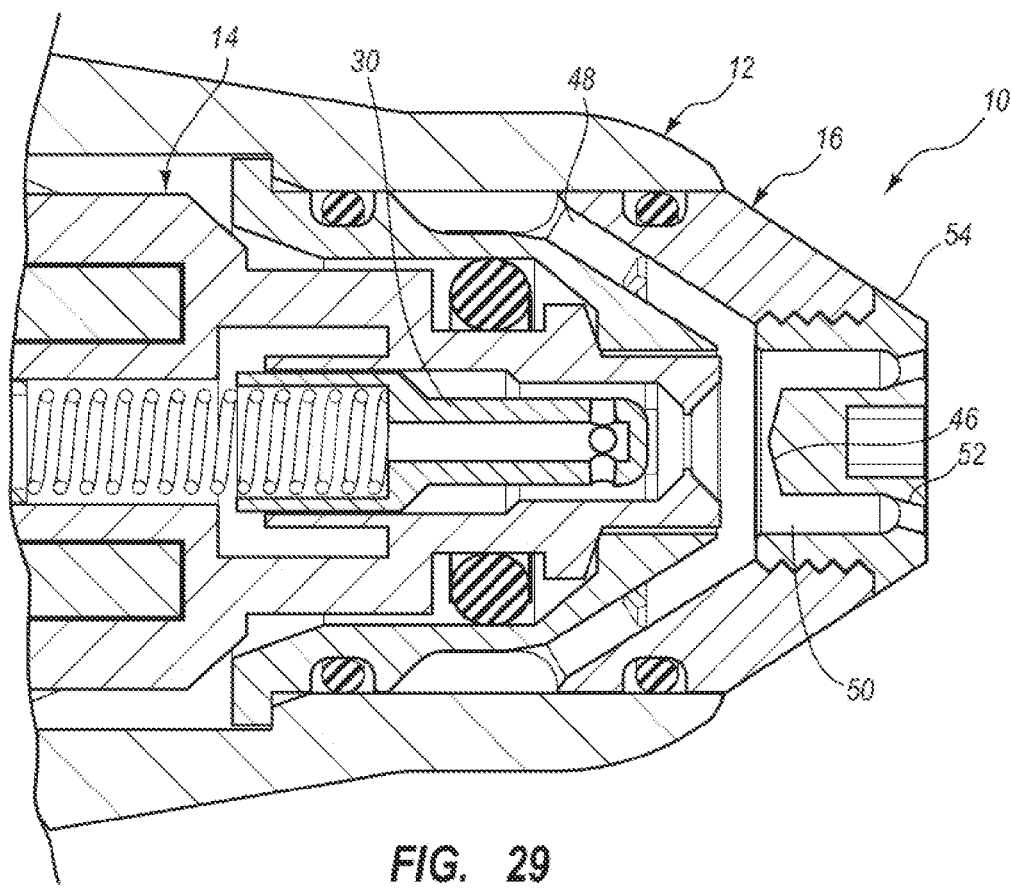
FIG. 29 illustrates an idle stage of operation of the fuel system of FIG. 1.

In a further operation step, air is evacuated from the atomizer 16 by turning OFF the airflow while maintaining the fuel OFF as shown in FIG. 28. In a final operation step, the airflow and fuel are maintained in an OFF state so that the fuel system remains idle.

Figure 30:
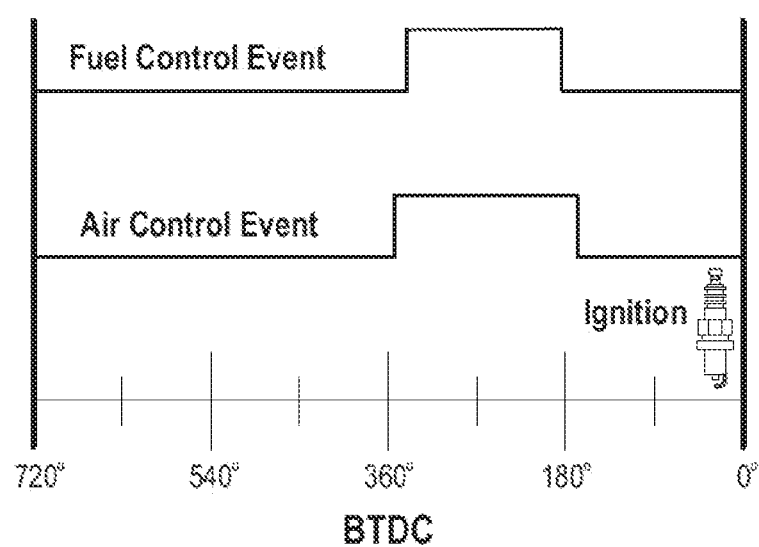
FIG. 30 is a graph showing an example air and fuel sequencing of a fuel system according to the present disclosure.

FIG. 30 illustrates the sequencing of turning the airflow and fuel supply ON and OFF relative to ignition in the cylinder of an engine (below top dead center (BTDC)). Typically, for a manifold or intake port installation, the air is maintained ON between about 360 degrees and about 180 degrees BTDC while the fuel is maintained ON for a timeframe between about 360 degrees and about 180 degrees BTDC that is less than how long the airflow is maintained ON and also within the range of 360 degrees to 180 degrees BTDC when the air is maintained ON.

The preceding description has been presented only to illustrate and describe certain aspects, embodiments, and examples of the principles claimed below. It is not intended to be exhaustive or to limit the described principles to any precise form disclosed. Many modifications and variations are possible in light of the above disclosure. Such modifications are contemplated by the inventor and within the scope of the claims. The scope of the principles described is defined by the following claims.

What is claimed is:

1. A fluid mixing device, comprising:
 a housing defining a longitudinal axis and comprising:
  a distal end and a proximal end;
  a mixing chamber positioned at the distal end;
  a first inlet configured to disperse a first fluid into the mixing chamber;
  a plurality of channels configured to deliver a second fluid into the mixing chamber, the plurality of channels being arranged at one or more angles relative to the longitudinal axis to create a swirl flow of the second fluid in the mixing chamber to facilitate mixing of the first and second fluids to create a mixture;
 a nozzle removably mounted to the distal end of the housing, the nozzle comprising:
  an impingement member extending proximally and exposed to the mixing chamber;
  a circumferential channel extending around the impingement member and arranged in flow communication with the mixing chamber;
  an impingement surface arranged at a proximal end of the impingement member against which the first fluid contacts, the impingement surface being arranged at an angle relative to the longitudinal axis;
  at least one outlet orifice positioned at a distal end of the nozzle and in flow communication with the circumferential channel, the at least one outlet orifice configured for delivery of the mixture out of the fluid mixing device to form a spray plume.

2. The fluid mixing device of claim 1, wherein the first inlet is arranged coaxially with the longitudinal axis.

3. The fluid mixing device of claim 1, wherein the first inlet is arranged at a first longitudinal position, and the plurality of channels each include an inlet that is positioned rearward of the first longitudinal position and an outlet that is positioned forward of the first longitudinal position and rearward of the impingement surface.

4. The fluid mixing device of claim 1, wherein the one or more angles includes a tangential angle relative to the longitudinal axis.

5. The fluid mixing device of claim 1, wherein the one or more angles includes a radial angle.

6. The fluid mixing device of claim 1, further comprising a first metering member that includes the first inlet.

7. The fluid mixing device of claim 1, wherein the angle of the impingement surface is greater than 0° and less than about 30° relative to a plane perpendicular to the longitudinal axis.

8. A method of mixing fluids, comprising:
providing a fluids mixing device comprising a housing and a nozzle removably mounted to a distal end of the housing, the housing including a mixing chamber, a first fluid inlet, and a plurality of inlet channels, the nozzle mounted including an impingement member extending proximally and defining an impingement surface at a proximal end thereof, a channel surrounding the impingement member, and at least one outlet orifice, the impingement surface arranged at an angle relative to a longitudinal axis of the mixing device, and the channel surrounding the impingement member being arranged in flow communication with the mixing chamber;
delivering a first fluid into the mixing chamber at the first fluid inlet, the first fluid contacting the impingement surface;
delivering a second fluid into the mixing chamber through the plurality of inlet channels, the plurality of inlet channels arranged at one or more angles relative to the longitudinal axis to create a swirl flow of the second fluid in the mixing chamber;
mixing the first fluid with the second fluid in the mixing chamber and the channel surrounding the impingement member to form a mixture;
delivering the mixture through the at least one outlet orifice at a location that is forward of the mixing chamber to form a spray plume of the mixture.

9. The method of claim 8, wherein the first fluid inlet is arranged at a first longitudinal location, and the second fluid is delivered into the mixing chamber at a second longitudinal location that is forward of the first longitudinal location and rearward of the impingement surface.

10. The method of claim 8, wherein delivering the second fluid into the mixing chamber includes delivering the second fluid in a direction that is at least partially radial and at least partially tangential relative to the longitudinal axis.

11. The method of claim 8, wherein delivering the mixture through the at least one outlet orifice includes rapid acceleration of the mixture to sonic speeds.

12. The method of claim 8, wherein the angle of the impingement surface is greater than 0° and less than about 30° relative to a plane perpendicular to the longitudinal axis.

13. The method of claim 8, wherein the first fluid is fuel and the second fluid is oxidizer.

14. The method of claim 8, wherein the plurality of inlet channels each have an inlet that is positioned rearward of the mixing chamber and an outlet adjacent to the mixing chamber.

15. A fluid mixing device, comprising:
a housing defining a mixing chamber and a plurality of inlet passages configured to deliver a second fluid to the mixing chamber to create a mixture, the plurality of inlet passages arranged to create a swirl flow of the second fluid in the mixing chamber;
a valve arranged in the housing to deliver a first fluid into the mixing chamber to mix with the second fluid to create the mixture;
a nozzle removably mounted to the housing, the nozzle comprising an impingement member extending proximally toward the housing and defining an impingement surface at a proximal end thereof, a channel surrounding the impingement member, and at least one outlet opening through which the mixture passes to form a spray plume, the impingement surface exposed to the mixing chamber and arranged in a flow path of the first fluid, the channel being in flow communication with the mixing chamber.

16. The fluid mixing device of claim 15, wherein the at least one outlet opening is positioned forward of the mixing chamber.

17. The fluid mixing device of claim 16, wherein the first fluid is delivered into the mixing chamber at a first location along a length of the fluid mixing device, and each inlet passage comprises an inlet that is positioned rearward of the first location and an outlet into the mixing chamber that is positioned forward of the first location and rearward of the impingement surface.

18. The fluid mixing device of claim 15, wherein the impingement surface is arranged at an angle of greater than 0° and less than about 30° relative to a plane arranged perpendicular to a longitudinal axis of the fluid mixing device.

19. The fluid mixing device of claim 15, wherein the impingement surface is arranged at a non-perpendicular angle relative to a longitudinal axis of the fluid mixing device.

20. The fluid mixing device of claim 15, wherein the channel is open to and continuous with the mixing chamber.

21. The fluid mixing device of claim 1, wherein (1) the first inlet is configured to form first droplets, (2) the impingement member is configured to break up the first droplets through mechanical impingement utilizing liquid energy, (3) the fluid mixing device is configured to cause a film of the first fluid to leave the impingement member and enter a surrounding flow of the second fluid, and to thereby cause the film to experience shear, and (4) the at least one outlet orifice is configured to form smaller droplets utilizing gas energy.

22. The fluid mixing device of claim 21, wherein the at least one outlet orifice includes multiple outlet orifices positioned at the distal end of the nozzle and in flow communication with the circumferential channel, the multiple outlet orifices being configured for delivery of the mixture out of the fluid mixing device to form the spray plume.

23. The method of claim 8, wherein (1) the step of delivering the first fluid into the mixing chamber includes forming first droplets of the first fluid, (2) the step of contacting the impingement surface includes breaking up the first droplets through mechanical impingement utilizing liquid energy, (3) the step of mixing the first fluid with the second fluid includes causing a film of the first fluid to leave the impingement surface and enter a surrounding flow of the second fluid, and thereby causing the film to experience shear, and (4) the step of delivering the mixture through the at least one outlet orifice includes forming smaller droplets utilizing gas energy.

24. The method of claim 23, wherein the at least one outlet orifice includes multiple outlet orifices for forming the spray plume.

25. The method of claim 23, wherein the step of delivering the mixture through the at least one outlet orifice includes accelerating the mixture to at least near-sonic velocity.

26. The method of claim 23, wherein the spray plume contains a homogenous mixture of the first and second fluids.

27. The method of claim 26, wherein the method includes atomizing the first fluid.

* * * * *